（12）United States Patent
Chen et al.

(10) Patent No.: US 10,705,347 B2
(45) Date of Patent: Jul. 7, 2020

(54) WAFER-LEVEL HIGH ASPECT RATIO BEAM SHAPING

(71) Applicant: Apple Inc., Cupertino, CA (US)

(72) Inventors: Tong Chen, Cupertino, CA (US); Wenrui Cai, San Jose, CA (US); Albert P. Heberle, Santa Clara, CA (US); Weiping Li, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/399,937

(22) Filed: Apr. 30, 2019

(65) Prior Publication Data

US 2019/0369405 A1 Dec. 5, 2019

Related U.S. Application Data

(60) Provisional application No. 62/678,201, filed on May 30, 2018.

(51) Int. Cl.
*G02B 27/09* (2006.01)
*F21V 5/00* (2018.01)
(Continued)

(52) U.S. Cl.
CPC .......... *G02B 27/0955* (2013.01); *F21V 5/004* (2013.01); *F21V 5/04* (2013.01);
(Continued)

(58) Field of Classification Search
CPC . G02B 27/0955; G02B 27/0922; F21V 5/004; F21V 5/04
See application file for complete search history.

(56) References Cited

U.S. PATENT DOCUMENTS 5,539,562 A 7/1996 Morioka
5,978,401 A 11/1999 Morgan
(Continued)

FOREIGN PATENT DOCUMENTS

JP 2000174543 A * 6/2000
WO WO 10/111961 10/2010

OTHER PUBLICATIONS

Leitgeb et al., "Using Tapers for Efficient Coupling of Received FSO-Signals into Fibres," 13th International Conference on Transparent Optical Networks in Stockholm, Sweden, Jun. 26-30, 2011, Institute of Broadband Communications, University of Technology, Graz, Austria, pp. 1-6.
(Continued)

*Primary Examiner* — Ida M Soward
(74) *Attorney, Agent, or Firm* — Brownstein Hyatt Faber Schreck, LLP

(57) ABSTRACT

A light-emitting device includes a semiconductor substrate, a surface-emitting semiconductor light source on the semiconductor substrate, a monolithic first dielectric, and a second dielectric. The monolithic first dielectric is transparent to light emitted by the light source and includes first and second micro-lenses adjacent an aperture of the light source and having axes parallel to and offset from an axis of a beam of light emitted by the light source, and a saddle-shaped lens over the aperture of the light source. The saddle-shaped lens connects the first and second micro-lenses and reshapes the beam of light emitted by the light source to have a high aspect ratio. The second dielectric is transparent to light emitted by the light source and encapsulates a light emission surface of the saddle-shaped lens. The second dielectric has a higher refractive index than the monolithic first dielectric.

20 Claims, 23 Drawing Sheets

(51) Int. Cl.
   *F21V 5/04*      (2006.01)
   *F21Y 115/30*    (2016.01)
   *F21Y 115/15*    (2016.01)

(52) U.S. Cl.
   CPC ....... *G02B 27/0922* (2013.01); *F21Y 2115/15* (2016.08); *F21Y 2115/30* (2016.08)

(56) References Cited

U.S. PATENT DOCUMENTS

| | | | |
|---|---|---|---|
| 6,055,262 A | 4/2000 | Cox et al. | |
| 6,253,097 B1 | 6/2001 | Aronow et al. | |
| 6,272,269 B1 | 8/2001 | Naum | |
| 6,348,684 B1 | 2/2002 | Nykolak et al. | |
| 6,459,835 B1 | 10/2002 | Nagaoka et al. | |
| 6,574,398 B2 | 6/2003 | Coldren et al. | |
| 7,692,859 B2* | 4/2010 | Redert | H04N 13/302 359/478 |
| 8,038,822 B2* | 10/2011 | Kindler | G02B 26/123 156/245 |
| 8,073,343 B2 | 12/2011 | Yuki et al. | |
| 8,783,893 B1 | 7/2014 | Seurin et al. | |
| 8,995,841 B1 | 3/2015 | Chalfant, III et al. | |
| 9,171,723 B2* | 10/2015 | Hallam | H01L 31/02242 |
| 9,406,716 B2* | 8/2016 | Lin | H01L 27/14629 |
| 9,825,086 B2* | 11/2017 | Kawahara | H01L 27/14685 |
| 9,929,806 B2 | 3/2018 | Wabnig et al. | |
| 9,998,217 B2 | 6/2018 | Li et al. | |
| 10,031,158 B1 | 7/2018 | Douglas et al. | |
| 10,072,815 B2 | 9/2018 | MacKinnon et al. | |
| 10,177,186 B2* | 1/2019 | Wang | H01L 27/14645 |
| 10,181,895 B2 | 1/2019 | Liu | |
| 10,367,021 B2* | 7/2019 | Jangjian | H01L 27/14621 |
| 2002/0196563 A1* | 12/2002 | Itoh | H01L 27/14627 359/741 |
| 2004/0057228 A1* | 3/2004 | Huang | H04N 1/02815 362/89 |
| 2006/0103941 A1 | 5/2006 | Yamaguchi et al. | |
| 2015/0144918 A1 | 5/2015 | Cho et al. | |
| 2017/0353680 A1 | 12/2017 | Fukuda | |
| 2018/0278828 A1 | 9/2018 | Moon | |
| 2018/0367767 A1 | 12/2018 | MacKinnon | |
| 2019/0372666 A1 | 12/2019 | Momtahan | |
| 2019/0372667 A1 | 12/2019 | Momtahan et al. | |

OTHER PUBLICATIONS

U.S. Appl. No. 16/298,696, filed Mar. 11, 2019, Momtahan.
U.S. Appl. No. 16/399,925, filed Apr. 30, 2019, Momtahan et al.

\* cited by examiner

WAFER-LEVEL HIGH ASPECT RATIO BEAM SHAPING

CROSS-REFERENCE TO RELATED APPLICATION

This application is a nonprovisional of and claims the benefit under 35 U.S.C. 119(e) of U.S. Provisional Patent Application No. 62/678,201, filed May 30, 2018, and entitled "Wafer-Level High Aspect Ratio Beam Shaping," the contents of which are incorporated herein by reference as if fully disclosed herein.

FIELD

The described embodiments relate generally to wafer-level high aspect ratio beam shaping. More particularly, the described embodiments relate to a light-emitting device having a saddle-shaped lens that reshapes a beam of light to have a high aspect ratio.

BACKGROUND

Many electronic devices incorporate a light-emitting device. For example, a digital camera, smart phone, or tablet computer may have a camera associated with a camera flash. In some cases, such devices may be able to operate the camera flash in a steady-state ON mode, as may be required to provide a flashlight function or illumination for video recording. An electronic device may also or alternatively include a biosensor or bioauthentication sensor (e.g., a fingerprint sensor or camera), and a light source operable to provide visible or invisible illumination for the purpose of illuminating a body part that is to be scanned or imaged by the biosensor or bioauthentication sensor. Some electronic devices or systems, such as a set of one or more components forming part of a navigation system of a motor vehicle, may include a light source operable to provide illumination for a scanning depth sensor, single photon avalanche detector (SPAD) array, or other sensor used for vehicle navigation. An electronic device may also or alternatively include an optical communication system that emits visible or invisible light.

In some cases, it may be desirable to emit light having a high aspect ratio from an electronic device. For example, it may be desirable to emit light having a high aspect ratio when capturing a panoramic photo or video. It may also be desirable to emit light having a high aspect ratio when scanning or imaging a body part for purposes of analyzing the body part or authenticating a user of a device. High aspect ratio light may also be useful when operating a camera or sensor in a line-scan mode.

SUMMARY

Embodiments of the systems, devices, methods, and apparatus described in the present disclosure are directed to wafer-level high aspect ratio beam shaping. In accordance with described wafer processing techniques, a saddle-shaped lens may be formed over a surface-emitting semiconductor light source (e.g., a vertical-cavity surface-emitting laser (VCSEL), a vertical external-cavity surface-emitting laser (VECSEL), or a light-emitting diode (LED) (e.g., an organic LED (OLED), a resonant-cavity LED (RC-LED), a micro LED (mLED), a superluminescent LED (SLED), and so on). In some embodiments, a saddle-shaped lens may be formed over each light source in a set of light sources formed on a wafer, and the light sources and their associated lenses (or sets thereof) may be diced from the wafer after forming the saddle-shaped lenses. Each saddle-shaped lens may reshape a beam of light, emitted by a respective light source, to have a high aspect ratio. In some cases, different saddle-shaped lenses having different angular orientations may be formed on a wafer, or different saddle-shaped lenses having different aspect ratios may be formed on a wafer.

In a first aspect, the present disclosure describes a light-emitting device. The light-emitting device may include a semiconductor substrate, a surface-emitting semiconductor light source on the semiconductor substrate, a monolithic first dielectric, and a second dielectric. The monolithic first dielectric may be transparent to light emitted by the light source and include first and second micro-lenses and a saddle-shaped lens. The first and second micro-lenses may be adjacent an aperture of the light source and have axes parallel to and offset from an axis of a beam of light emitted by the light source. The saddle-shaped lens may be disposed over the aperture of the light source. The saddle-shaped lens may connect the first and second micro-lenses and reshape the beam of light emitted by the light source to have a high aspect ratio. The second dielectric may be transparent to light emitted by the light source, and may encapsulate a light emission surface of the saddle-shaped lens. The second dielectric may have a higher refractive index than the monolithic first dielectric.

In another aspect, the present disclosure describes another light-emitting device. The light-emitting device may include a semiconductor substrate, a surface-emitting semiconductor light source on the semiconductor substrate, a first dielectric, and a second dielectric. The first dielectric may be transparent to light emitted by the light source, and may include a saddle-shaped lens over an aperture of the light source. The saddle-shaped lens may reshape a beam of light emitted by the light source to have a high aspect ratio. The second dielectric may be transparent to light emitted by the light source, and may encapsulate a light emission surface of the saddle-shaped lens. The second dielectric may have a higher refractive index than the first dielectric.

In still another aspect of the disclosure, another light-emitting device is described. The light-emitting device may include a set of one or more semiconductor die, a set of surface-emitting semiconductor light sources, a first saddle-shaped lens, a second saddle-shaped lens, and a dielectric. The set of surface-emitting semiconductor light sources may be disposed on the set of one or more semiconductor die, and may include a first light source and a second light source. The first saddle-shaped lens may connect a first pair of micro-lenses, and may be disposed over a first aperture of the first light source. The second saddle-shaped lens may connect a second pair of micro-lenses, and may be disposed over a second aperture of the second light source. The dielectric may be transparent to light emitted by the first light source and the second light source, and may encapsulate light emission surfaces of the first saddle-shaped lens and the second saddle-shaped lens. Each of the first saddle-shaped lens and the second saddle-shaped lens may reshape a beam of light emitted by the first light source or the second light source to have a high aspect ratio. The first saddle-shaped lens may have a different angular orientation than the second saddle-shaped lens. The dielectric may have a higher refractive index than the first saddle-shaped lens and the second saddle-shaped lens.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
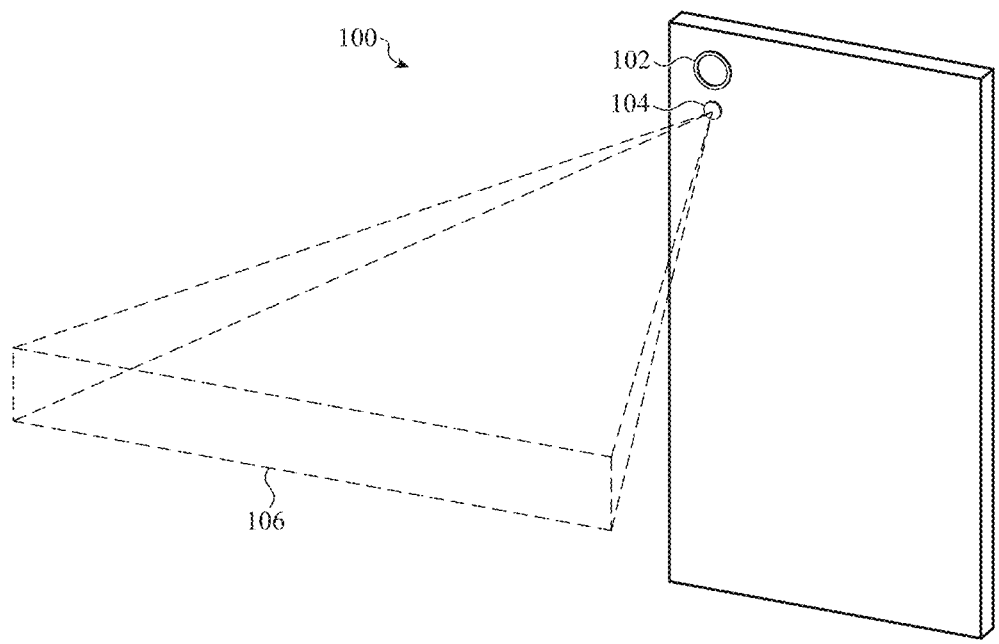
FIG. 1A shows an example of a smart phone having a camera.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to wafer-level techniques for shaping a beam of light to have a high aspect ratio (e.g., shaping a beam of light to have an ultra-wide field-of-view (FoV) in one direction and a narrower FoV in an orthogonal direction). In some embodiments, the disclosed techniques may be used to produce a saddle-shaped lens over an aperture of a surface-emitting semiconductor light source. The saddle-shaped lens may be positioned between a pair of micro-lenses or other dielectric features that are cross-linked (e.g., partially merged) to form the saddle-shaped lens. In some examples, the cross-link (or saddle-shaped lens) may be formed using one or more of thermal reflow, replicating, patterning, or imprinting processes performed at the wafer level. For purposes of this description, "light" is defined as any form of electromagnetic radiation and includes visible and invisible light.

Saddle-shaped lenses formed as described herein may be used to provide high aspect ratio illumination, with an optical element that is very small, that is integrated with a light source and/or positioned very close to (e.g., on) the aperture of a light source. This can reduce the stack-up height for a light source and its lens. The high aspect ratio beam shaping provided by a saddle-shaped lens also increases the divergence of a beam of light emitted by a laser or similar spot-like light source, thereby distributing the light source's optical power over a larger field of view and changing a device's eye safety class to improve the device's eye safety. Saddle-shaped lenses formed as described herein may also provide a lens per light source, whereas separately formed optical elements can be bulky, and may need to be positioned over more than one light source. This can compromise the beam-shaping ability per light source. A separate optical element attached to a light source may also be more prone to becoming dislodged from its light source(s).

Forming a saddle-shaped lens at the wafer level also reduces alignment errors, as the components used to form the saddle-shaped lens can be positioned very precisely with respect to a light source at the wafer level.

In some embodiments, a light-emitting device may include a semiconductor substrate, a surface-emitting semiconductor light source on the semiconductor substrate, a monolithic first dielectric, and a second dielectric. The monolithic first dielectric may be transparent to light emitted by the light source and include first and second micro-lenses and a saddle-shaped lens. The first and second micro-lenses may be adjacent an aperture of the light source and have axes parallel to and offset from an axis of a beam of light emitted by the light source. The saddle-shaped lens may be disposed over the aperture of the light source. The saddle-shaped lens may connect the first and second micro-lenses and reshape the beam of light emitted by the light source to have a high aspect ratio. The second dielectric may be transparent to light emitted by the light source, and may encapsulate a light emission surface of the saddle-shaped lens. The second dielectric may have a higher refractive index than the monolithic first dielectric.

These and other embodiments are discussed with reference to FIGS. 1-13. However, those skilled in the art will readily appreciate that the detailed description given herein with respect to these figures is for explanatory purposes only and should not be construed as limiting.

FIG. 1A shows an example of a smart phone 100 having a camera 102. By way of example, FIG. 1A shows a backside of the smart phone 100, and the camera 102 is shown to be a rear-facing camera. In other embodiments, the camera 102 could be positioned on the frontside of the smart phone 100, or the smart phone 100 could also have a front-facing camera.

The smart phone 100 has a light source 104 positioned adjacent the camera 102. In alternate embodiments, the light source 104 could be positioned closer to the camera 102 or more distant from the camera 102. When the camera is used in low light settings, the light source 104 may be flashed to illuminate an object or scene imaged by the camera 102. If the camera 102 is capable of recording video, the light source 104 may be turned ON to provide steady-state illumination. In some cases, the light source 104 may be turned ON and operated as a flashlight.

When capturing a panoramic photo or video, or when needing high aspect ratio illumination (e.g., to light a sidewalk), it may be useful to have a light source that emits a beam of light having a high aspect ratio 106. The light source 104 may therefore include one or more of the light-emitting devices described herein. In some cases, the light source 104 may include a high aspect ratio light-emitting device in addition to (or in some cases, instead of) a light-emitting device that provides spot or flood-type illumination.

In alternative embodiments, the camera 102 and light source 104 may be included in a camera device, a tablet computer, a laptop computer, or other electronic device or system.

Figure 1B:
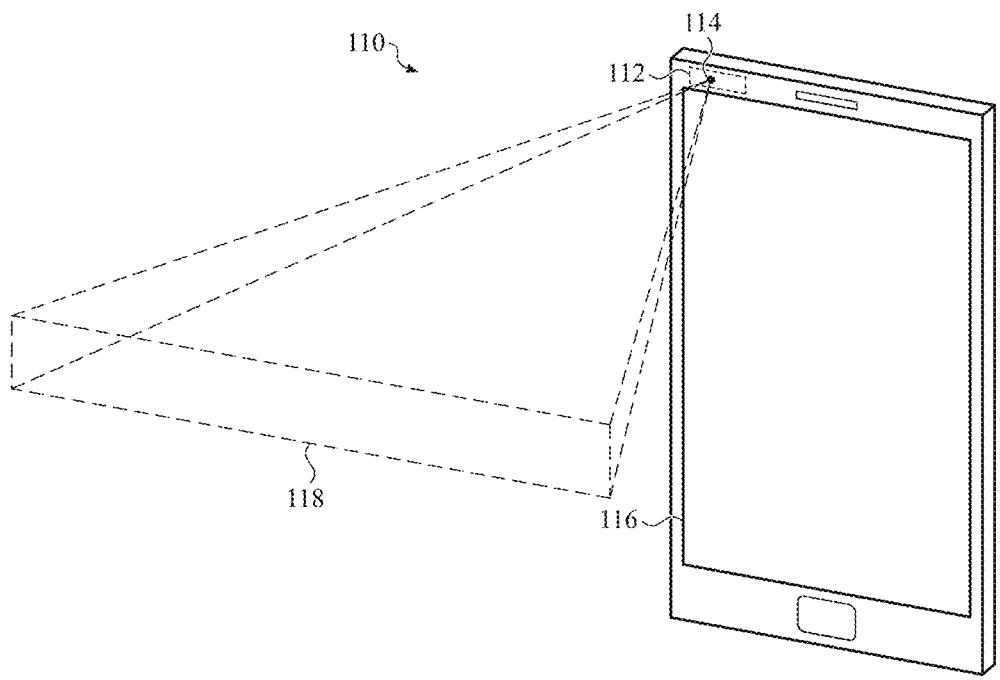
FIG. 1B shows an example of an electronic device having a bioauthentication sensor.

FIG. 1B shows an example of an electronic device 110 having a bioauthentication sensor 112. In some examples, the electronic device 110 may be a smart phone having a display 116, and in some embodiments, the electronic device 110 may be the smart phone 100 described with reference to FIG. 1. In these examples, the view shown in FIG. 1B may be the front side of the smart phone 100.

The bioauthentication sensor 112 may include or be associated with a light source 114 that emits visible or invisible light (i.e., electromagnetic radiation). The visible or invisible light (e.g., infrared (IR) light) may be emitted to illuminate a body part that is to be scanned or imaged by the bioauthentication sensor 112. In some examples, the bioauthentication sensor 112 may include a facial feature scanning camera. In some examples, the bioauthentication sensor 112 may include a fingerprint sensor, and the light source 114 may be positioned under or adjacent the fingerprint sensor.

When scanning a body part (e.g., a face, eye, finger, limb, etc.) of a user, it may be useful to have a light source that emits a beam of light having a high aspect ratio 118. The light source 114 may therefore include one or more of the light-emitting devices described herein. In some cases, the light source 114 may include a high aspect ratio light-emitting device in addition to (or in some cases, instead of) a light-emitting device that provides spot or flood-type illumination.

In alternative embodiments, the bioauthentication sensor 112 and light source 114 may be included in a camera device, a tablet computer, a laptop computer, or other electronic device or system.

Figure 1C:
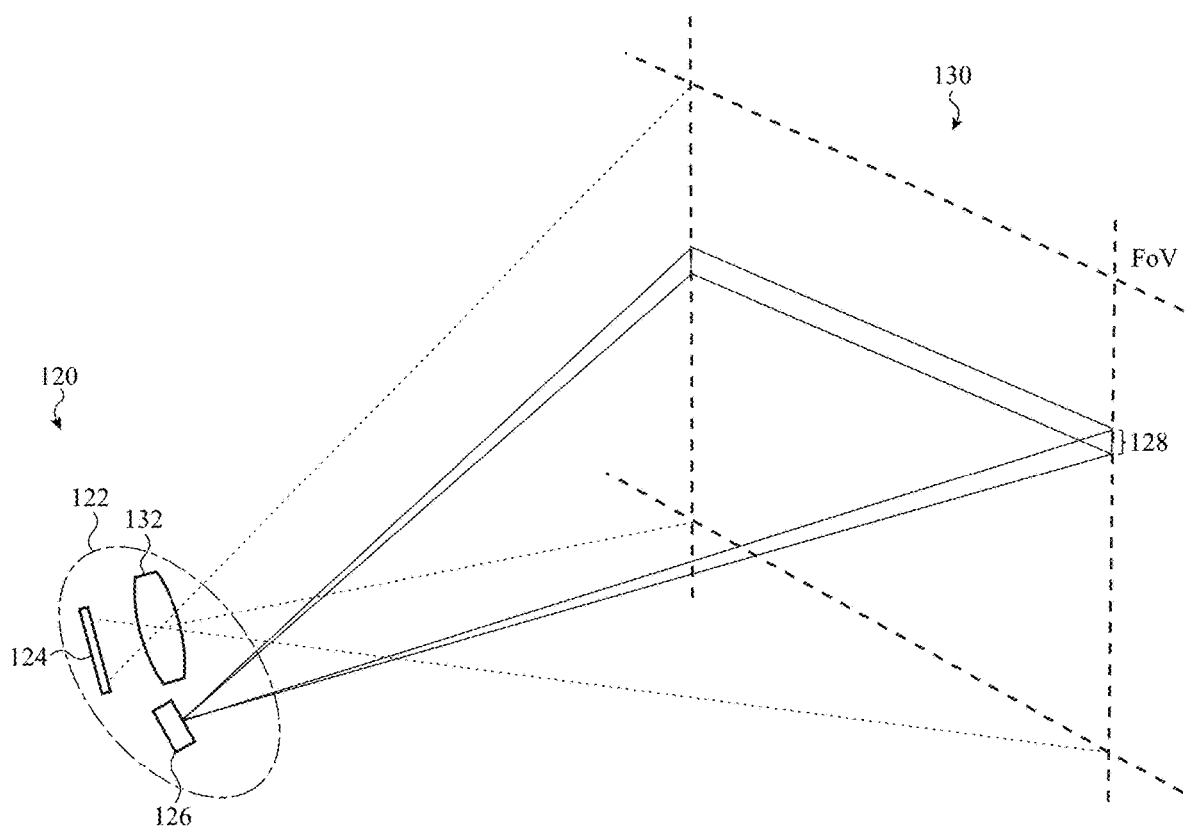
FIG. 1C shows an example of a device having a navigation system.

FIG. 1C shows an example of a device having a navigation system 120. By way of example, the navigation system 120 may include a scanning depth sensor 122. One type of navigation system 120 that includes a scanning depth sensor 122 is a light detection and ranging (LIDAR) system. The scanning depth sensor 122 may include a SPAD array 124. In other embodiments, the navigation system 120 may include another type of sensor, or an array of light-sensing pixels other than the SPAD array 124.

The navigation system 120 may perform a line-scan operation to detect the presence of an object and determine a range to the object. In addition to the SPAD array 124, the scanning depth sensor 122 may include a light-emitting device 126, which may emit visible or invisible light. The light-emitting device 126 may emit a sequence of light pulses, separated by time periods during which no light is emitted. The time period between each light pulse may be referred to as a pulse repetition interval (PRI). In some cases, it can be useful for the light-emitting device 126 to emit a beam of light having a high aspect ratio 128.

The beam of light 128 may be emitted into a FoV 130 and illuminate a section (e.g., a line) of the FoV 130. The beam of light 128 may be steerable (e.g., up or down) within the FoV 130.

Emitted light that reflects or is otherwise redirected from an object and/or a scene in the FoV 130 may be received by a lens 132 that directs the light onto the SPAD array 124. In some embodiments, a processor associated with the navigation system 120 may compute time-of-flight times for pulses of light emitted into the FoV 130.

In some examples, the navigation system 120 may be implemented as one or more components of a navigation system included in a motor vehicle.

Figure 1D:
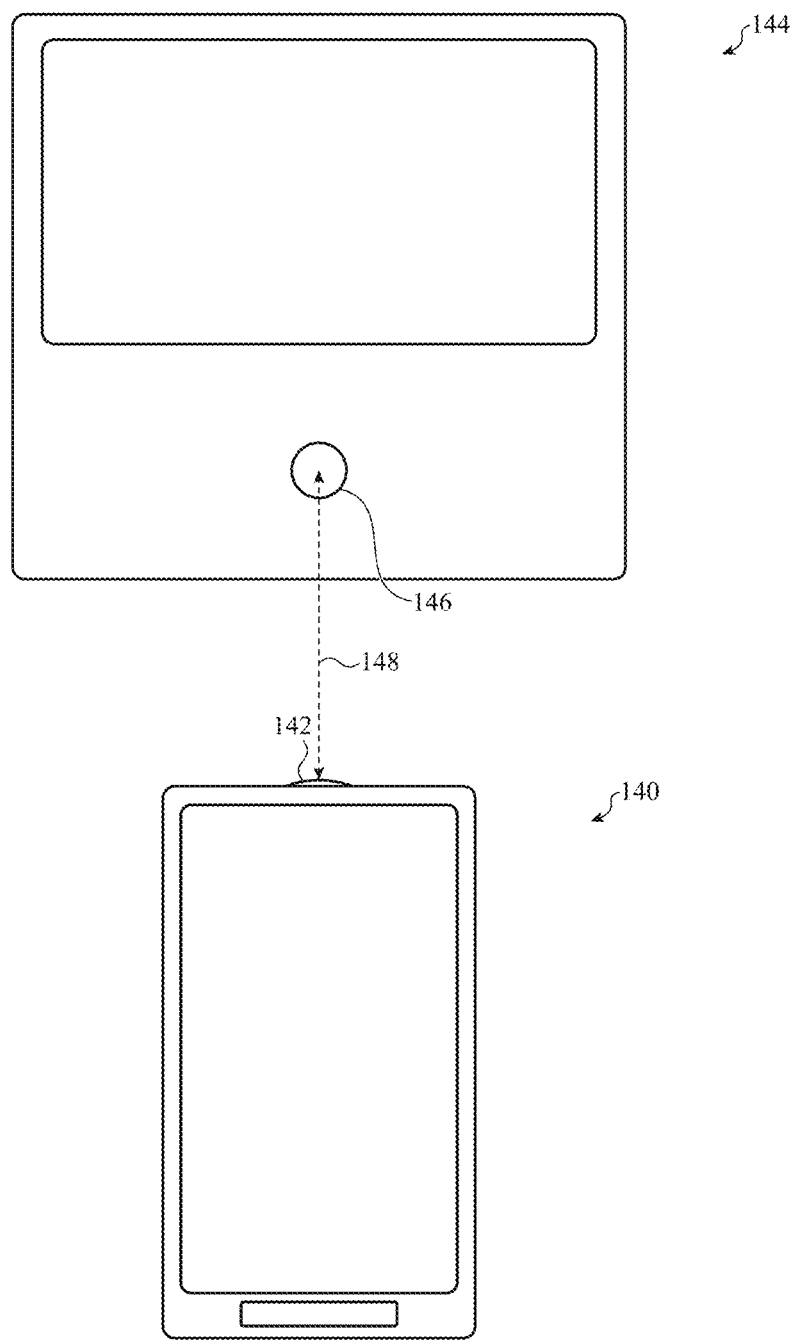
FIG. 1D shows an example of an electronic device having a light source for transmitting optical communications to a host device.

FIG. 1D shows an example of an electronic device 140 having a light source 142 for transmitting optical communications to a host device 144. In some examples, the electronic device 140 may be a remote control device (or smart phone or other device operating as a remote control device).

The electronic device 140 may be spatially discovered by, authenticated by, tracked by, and communicate with the host device 144 by transmitting optical communications using the light source 142. The optical communications may be received by a photodetector or other sensor 146 on the host device 144. In some environments or applications, it may be useful for the electronic device 140 to transmit optical communications in one or multiple beams of light having a high aspect ratio 148, which beams of light may be fixed or scanning.

Figure 2:
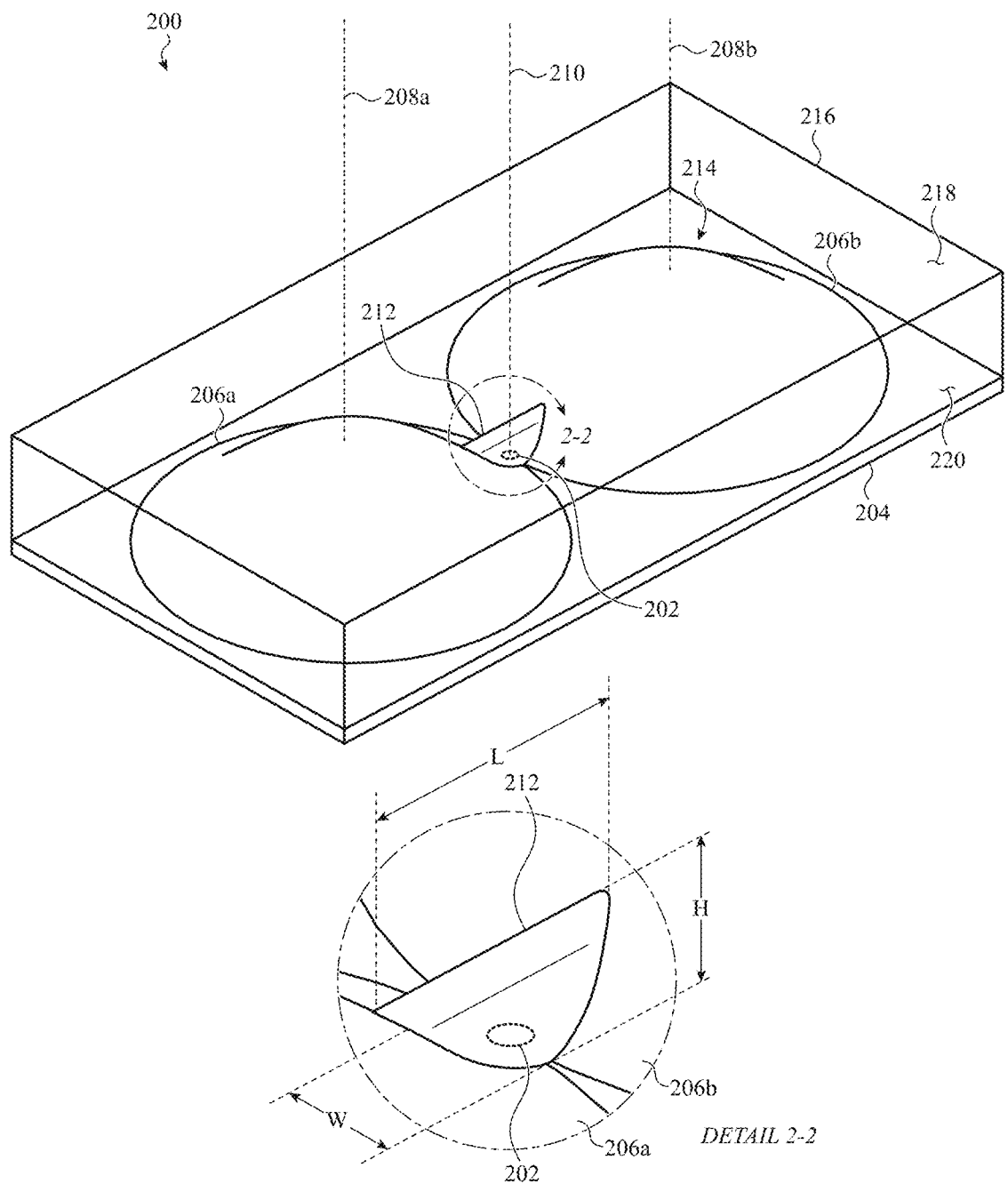
FIG. 2 shows a first example of a light-emitting device including a surface-emitting semiconductor light source.

FIG. 2 shows a first example of a light-emitting device 200 including a surface-emitting semiconductor light source 202 (e.g., a VCSEL, VECSEL, OLED, RC-LED, mLED, or SLED). The light-emitting device 200 may be used in any of the light sources described with reference to FIGS. 1A-1D. The light source 202 may be formed on a semiconductor substrate 204 (e.g., a semiconductor die diced from a semiconductor wafer).

A pair of micro-lenses 206a, 206b may be formed adjacent an aperture of the light source 202. By way of example, the pair of micro-lenses 206a, 206b may include a first micro-lens 206a and a second micro-lens 206b. Axes 208a, 208b of the first and second micro-lenses 206a, 206b may be parallel to and offset from an axis 210 of a beam of light emitted by the light source 202. A saddle-shaped lens 212 connects the first and second micro-lenses 206a, 206b and is positioned over the aperture of the light source 202. The saddle-shaped lens 212 may have different contours/curvatures in orthogonal directions, and may reshape a beam of light emitted by the light source 202 to have a high aspect ratio. In some embodiments, the beam of light emitted by the light source 202 may have a generally circular and symmetrical cross-section, and the saddle-shaped lens 212 may reshape (i.e., alter the shape) of the beam's cross-section to have a high aspect ratio. A beam of light having a high aspect ratio is defined herein to be a beam of light having a cross-section with first and second perpendicular (or substantially perpendicular) diameters, with the first diameter being smaller than the second diameter. A beam of light having a high aspect ratio is also defined herein to be a beam of light that diverges at a greater angle (or has a wider FoV) in a first plane including the axis 210 of the beam of light (e.g., in one direction) than in a second plane including the axis 210 of the beam of light (e.g., in another direction), with the first plane or first direction being perpendicular (or substantially perpendicular) to the second plane or second direction.

The saddle-shaped lens 212 may have a height (H) and a width (W) at a center of its length (L), with the length (L) being greater than the width (W). The saddle-shaped lens 212 may have a highly anamorphic saddle shape along its ridge, which shape may be controlled by photo mask design and thermal reflow process parameters when performing wafer processing methods such as those described with reference to FIGS. 5-8. In some embodiments, the pair of micro-lenses 206a, 206b may be connected not only by the saddle-shaped lens 212, but by flatter portions of a dielectric that forms the micro-lenses 206a, 206b and saddle-shaped lens 212. The light emission surfaces of the saddle-shaped lens 212 may contact the semiconductor substrate 204 or a layer thereon (e.g., the flatter portion of the dielectric that forms the micro-lenses 206a, 206b and saddle-shaped lens 212), at e.g. a slope angle equal to or larger than 40 degrees.

The pair of micro-lenses 206a, 206b and saddle-shaped lens 212 may form a monolithic first dielectric 214. The first dielectric 214 may be transparent to light emitted by the light source 202 (e.g., transparent to one or more, or all, wavelengths of light emitted by the light source 202). In some embodiments, the light source 202 may emit coherent light having only a single wavelength.

A second dielectric 216, having a higher refractive index than the monolithic first dielectric 214, may encapsulate a light emission surface of the saddle-shaped lens 212. In some examples, the refractive index of the second dielectric 216 may be more than 0.2 times larger than (or more than 20 percent (20%) higher than) the refractive index of the monolithic first dielectric 214). The second dielectric 216 may be transparent to light emitted by the light source 202 (e.g., transparent to one or more, or all, wavelengths of light emitted by the light source 202), and may prevent light emitted by the light source 202 from experiencing total internal reflection within the saddle-shaped lens 212. Total internal reflection may occur, absent the second dielectric 216, because of the steep curvature of the saddle-shaped lens 212. In some embodiments, the second dielectric 216 may cover all surfaces of the monolithic first dielectric 214 other than a surface (or surfaces) of the first monolithic dielectric that abuts the semiconductor substrate 204 or flatter portion of the dielectric that forms the saddle-shaped lens 212 and micro-lenses 206a, 206b. The second dielectric 216 may have a light emission surface 218 parallel to a surface 220 of the semiconductor substrate 204 that contains the aperture of the light source 202 (i.e., parallel to an aperture-containing surface 220 of the semiconductor substrate 204). The second dielectric 216 may facilitate low-loss beam bending and provide surface passivation/protection. The combination of the saddle-shaped lens 212 and second dielectric 216 having higher refractive index provides a moderate positive optical power along the ridge of the saddle-shaped lens 212, which tends to collimate (decrease) the divergence of the light beam emitted by the light source 202. The combination of saddle-shaped lens 212 and second dielectric 216 also provides a strong negative optical power across the ridge of the saddle-shaped lens 212, which tends to increase the divergence of the light beam emitted by the light source 202.

In some embodiments of the light-emitting device 200, the micro-lenses 206a, 206b may be replaced with other dielectric features. In some embodiments, the micro-lenses 206a, 206b or other dielectric features may partially or wholly removed when the light-emitting device 200 is diced from a semiconductor wafer.

Figure 3A:
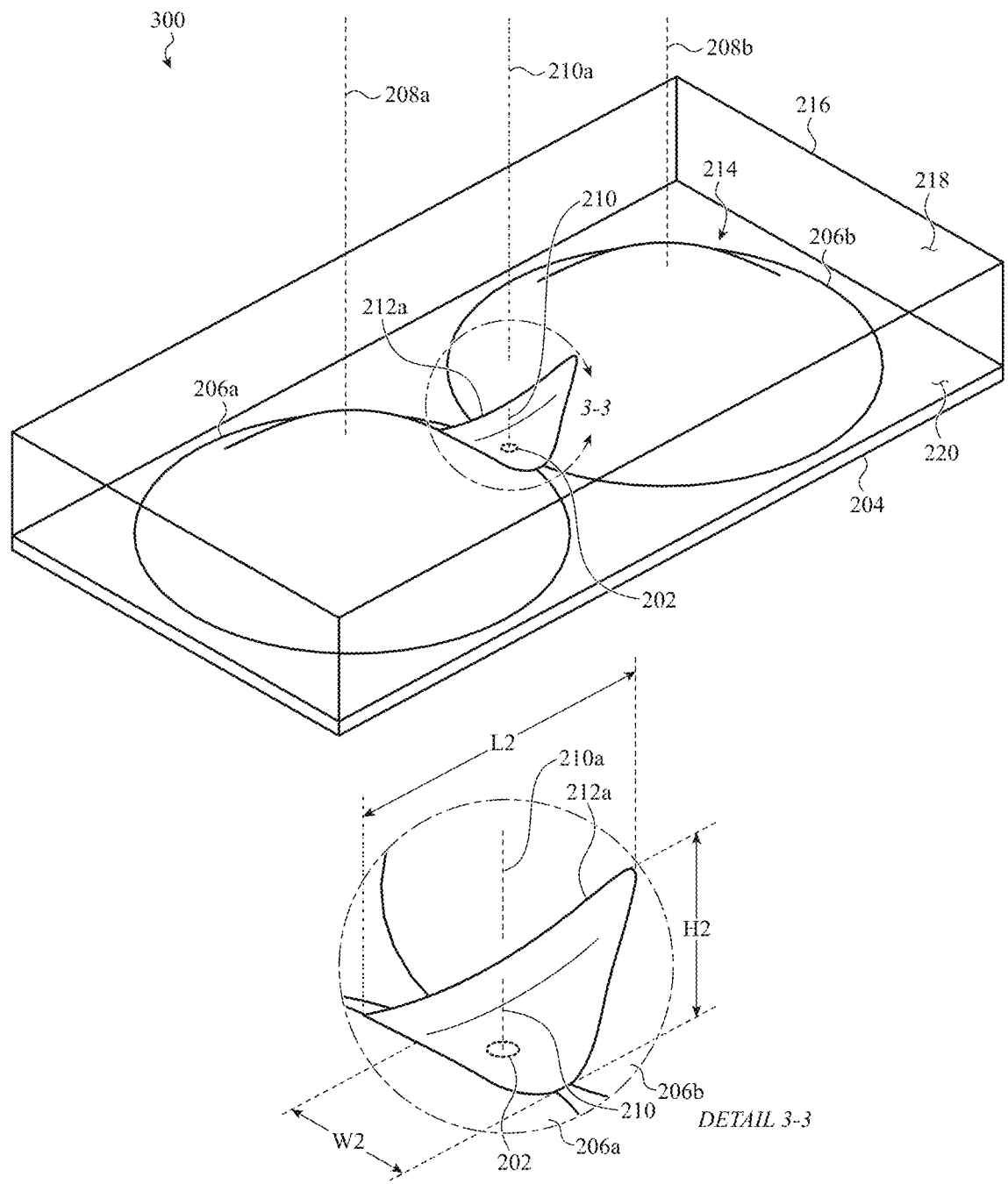
FIG. 3A shows a second example of a light-emitting device including a surface-emitting semiconductor light source.

FIG. 3A shows a second example of a light-emitting device 300 including a surface-emitting semiconductor light source 202. The light-emitting device 300 may be used in any of the light sources described with reference to FIGS. 1A-1D. The light-emitting device 300 may be similar in most respects to the light-emitting device 200 described with reference to FIG. 2, but may have a saddle-shaped lens 212a with a height (H2) and width (W2) at a center of its length (L2), with the length (L2) being greater than the width (W2). The height H2 of the saddle-shaped lens 212a may be greater than the height H of the saddle-shaped lens 212. The higher height of the saddle-shaped lens 212a may enable the saddle-shaped lens 212a to reshape a beam of light emitted by the light source 202 to have a higher aspect ratio than the beam of light emitted from the saddle-shaped lens 212.

In FIG. 3A, the saddle-shaped lens 212a is shown to have an axis 210a that is distinct from the axis 210 of the beam of light emitted by the light source 202. In some embodiments, the saddle-shaped lens 212a may be formed such that the axis 210a is offset from the axis 210. In this manner, the saddle-shaped lens 212a may not only reshape the beam of light to have a high aspect ratio, but may also bend the beam of light (e.g., change its direction).

Figure 3B:
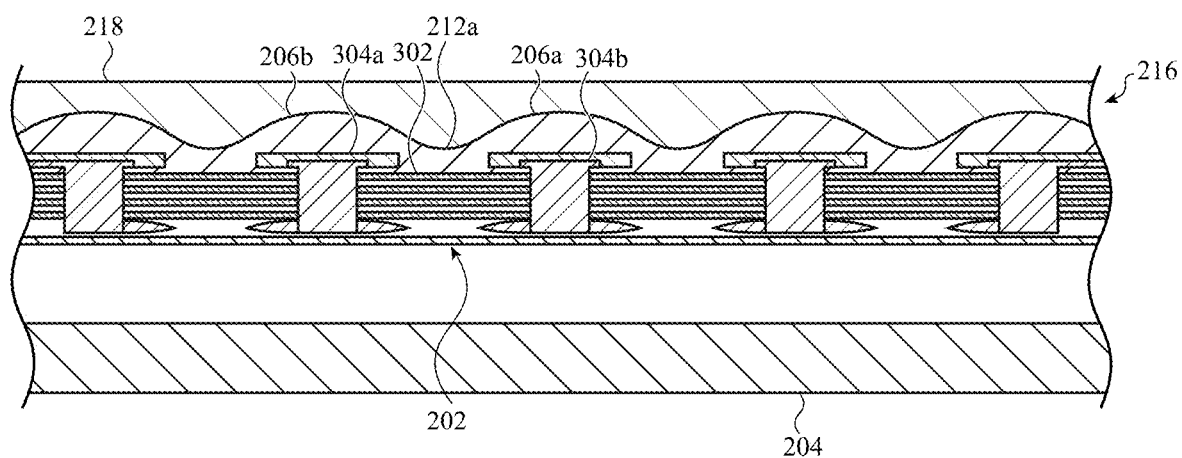
FIG. 3B shows a cross-section of the light-emitting device shown in FIG. 3A.

FIG. 3B shows a cross-section of the light-emitting device 300 shown in FIG. 3A. As shown, the saddle-shaped lens 212a is disposed over an aperture 302 of a light source 202. The aperture 302 of the light source 202 may be disposed adjacent a contact 304a, or between a pair of contacts 304a, 304b. All of the structures shown in FIGS. 3A & 3B may be formed using wafer processing techniques, as described for example with reference to FIGS. 5, 6A-6H, 7, and 8A-8I.

Figure 3C:
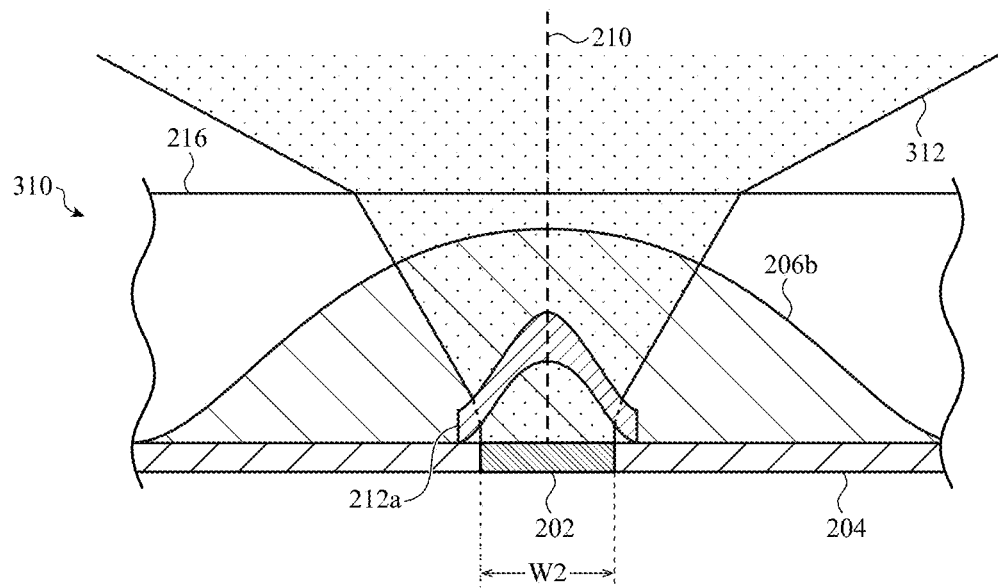
FIG. 3C shows a divergence of light emitted across the width of the light-emitting device shown in FIGS. 3A and 3B.
Figure 3D:
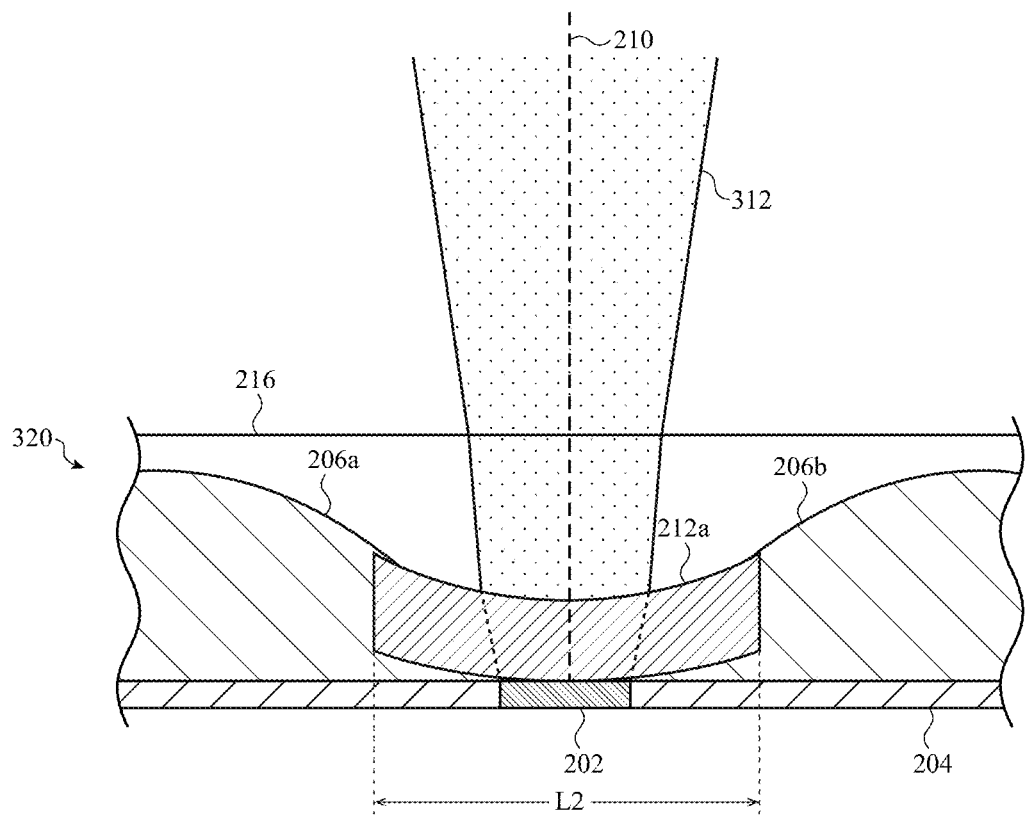
FIG. 3D shows a divergence of light emitted across the length of the light-emitting device shown in FIGS. 3A and 3B.

FIG. 3C shows a divergence 310 of light emitted across the width (W2) of the saddle-shaped lens 212a shown in FIGS. 3A and 3B. FIG. 3D shows a divergence 320 of light emitted across the length (L2) of the saddle-shaped lens 212a shown in FIGS. 3A and 3B. FIGS. 3C and 3D illustrate the reshaping of a beam of light 312 by the saddle-shaped lens 212a, and illustrate the high aspect ratio of the beam of light 312 after it exits the saddle-shaped lens 212a. The beam of light 312 may further diverge in at least the direction of its width (W2) as it leaves the second dielectric 216. In some embodiments, the saddle-shaped lens 212a and second dielectric 216 may reshape a beam of light 312 emitted by the light source 202 to have a beam divergence of greater than or equal to 120 degrees in a first plane including the axis 210 of the beam of light 312 (as shown in FIG. 3C), and less than or equal to 20 degrees in a second plane including the axis 210 of the beam of light 312 (e.g., in a second plane perpendicular (or substantially perpendicular) to the first plane, as shown in FIG. 3D).

Figure 4A:
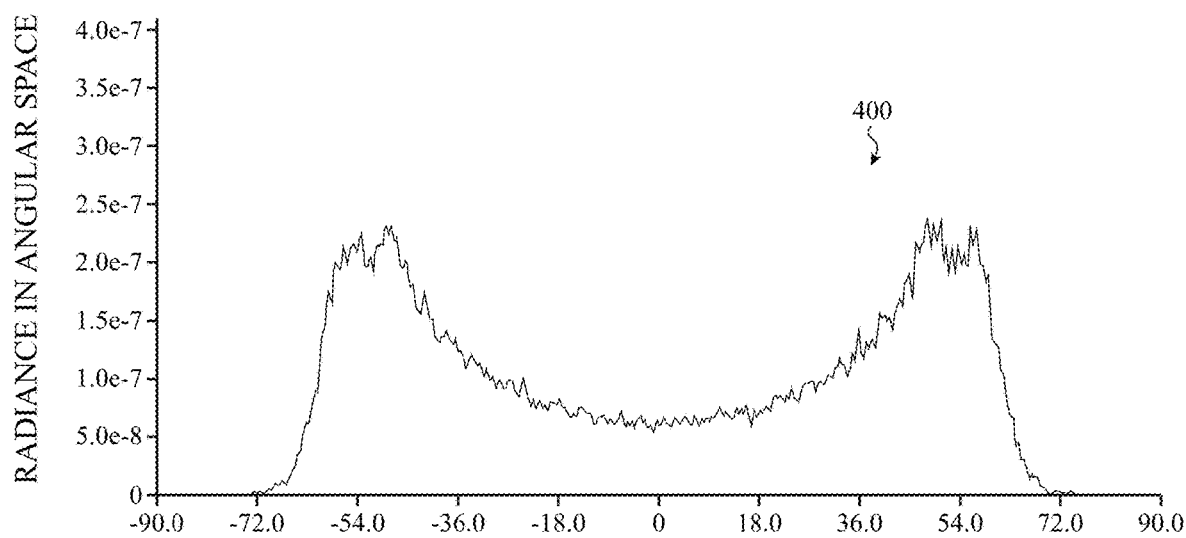
FIG. 4A illustrates far field illumination provided by the light-emitting device described with reference to FIG. 3A, in an angular space.
Figure 4A:
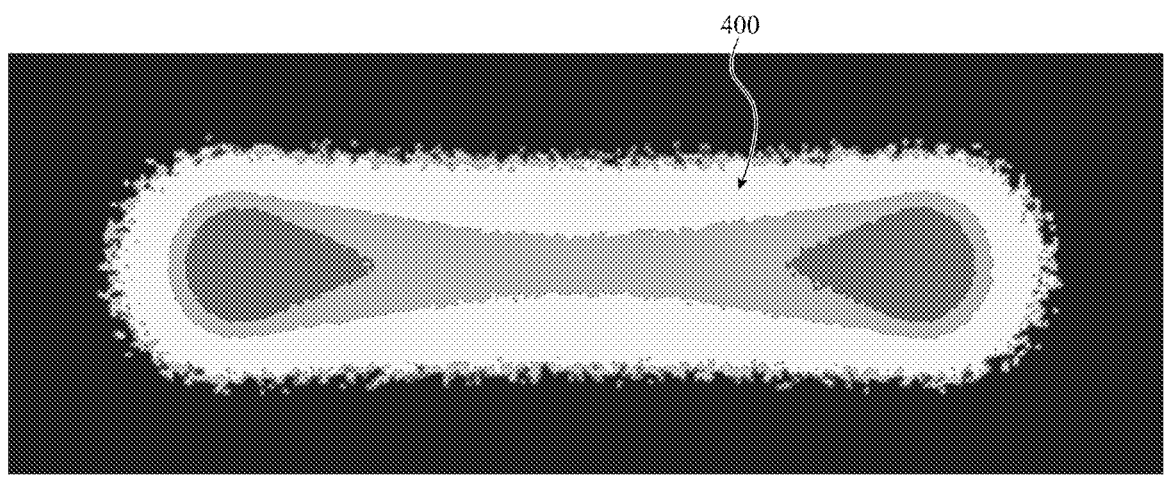
Figure 4B:
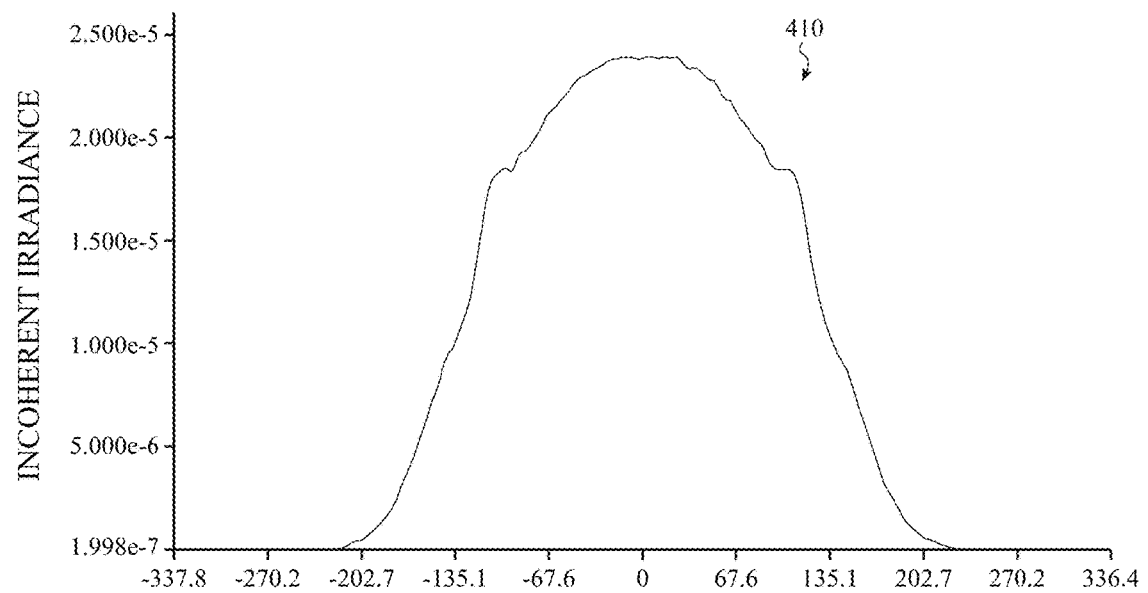
FIG. 4B illustrates far field illumination provided by the light-emitting device described with reference to FIG. 3A, in a position space.
Figure 4B:
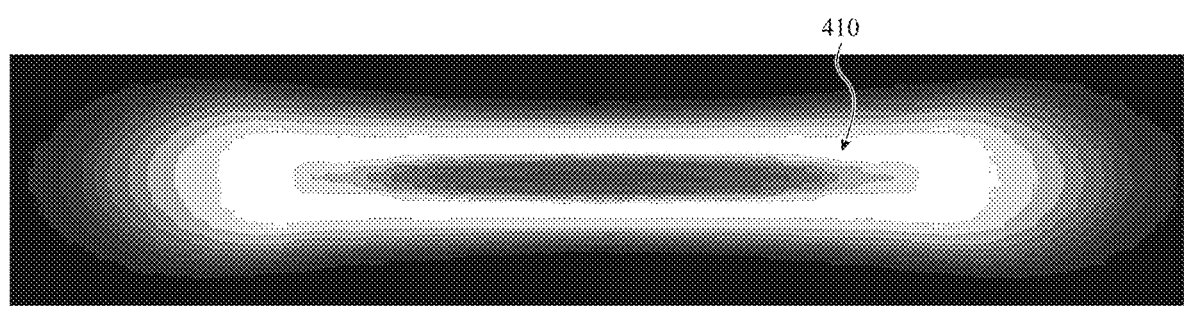

FIG. 4A illustrates far field illumination 400 provided by the light-emitting device 300 described with reference to FIG. 3A, in an angular space. In particular, FIG. 4A shows the relationship between radiance in the angular space in relation to an angle (in degrees) of beam divergence. FIG. 4B illustrates far field illumination 410 provided by the light-emitting device 300 described with reference to FIG. 3A, in a position space. In particular, FIG. 4B shows the relationship between incoherent irradiance in the position space and an angle (in degrees) of beam divergence.

Figure 5:
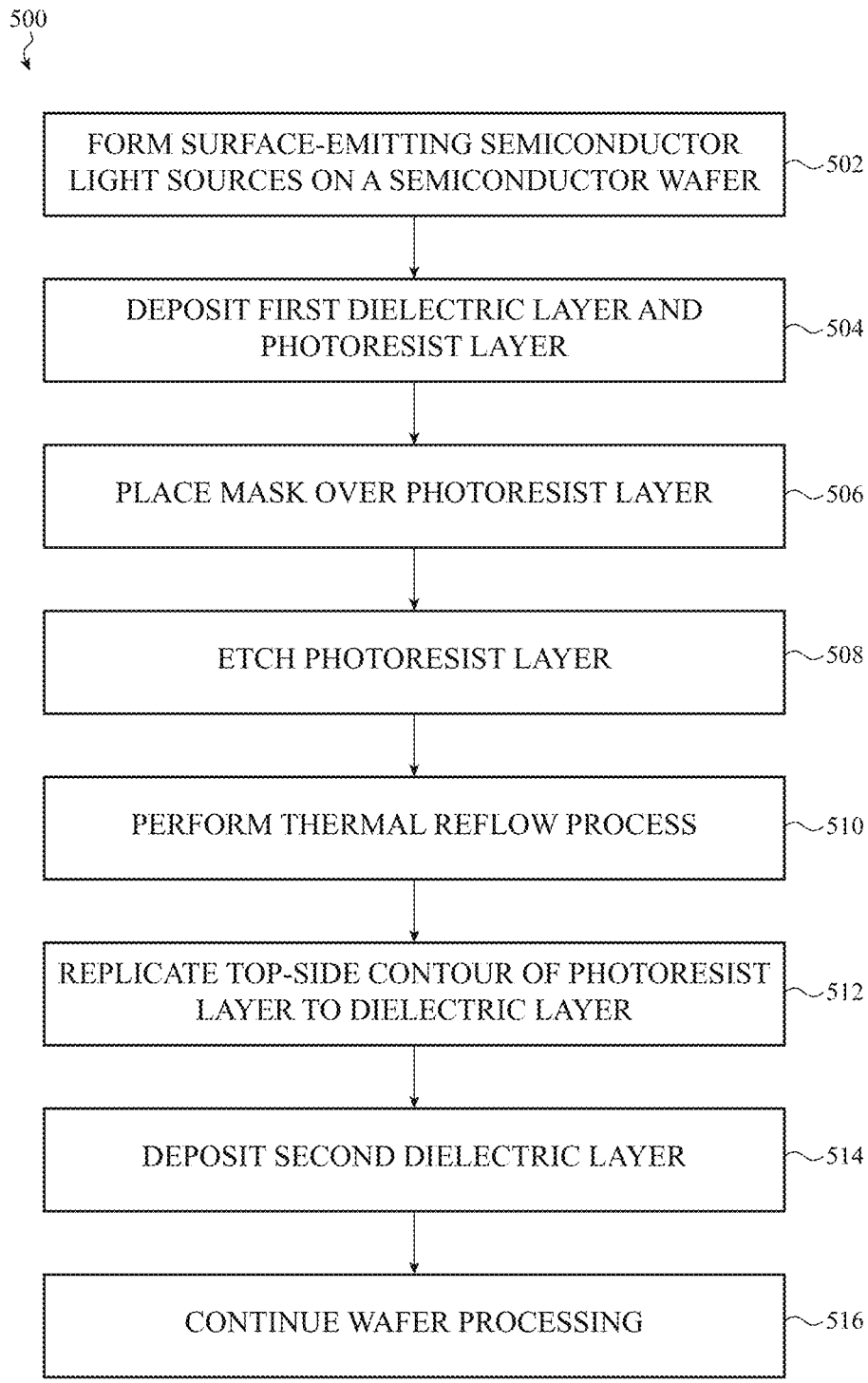
FIG. 5 shows a first example of a method for making a plurality of light-emitting devices, including, for example, the light-emitting device described with reference to FIG. 2 or 3A.

FIG. 5 shows a first example of a method 500 for making a plurality of light-emitting devices, including, for example, the light-emitting device described with reference to FIG. 2 or 3A. The light-emitting devices are formed on a wafer, using wafer processing techniques. FIGS. 6A-6H show example cross-sections of various interim forms of the light-emitting devices, which interim forms of the light-emitting device may exist after performing the operation(s) included in various blocks of the method 500.

Figure 6A:
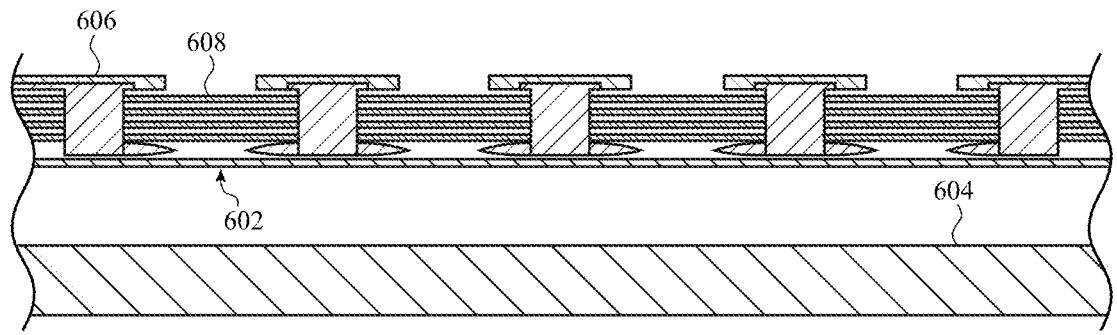
FIGS. 6A-6H show example cross-sections of various interim forms of light-emitting devices, which interim forms of light-emitting devices may exist after performing the operation(s) included in various blocks of the method described with reference to FIG. 5.

At block 502, and with reference to FIG. 6A, the method 500 may include forming a plurality of surface-emitting semiconductor light sources 602 on a semiconductor wafer 604. The semiconductor light sources 602 may include, for example, VCSELs, VECSELs, OLEDs, RC-LEDs, mLEDs, or SLEDs. In some embodiments, formation of the light sources 602 may include (or conclude with) forming and patterning an electrically conductive top-side layer 606 (e.g., a gold (Au) layer). The top-side gold layer 606 may include contacts for driving the light sources 602. The contacts may be formed adjacent (e.g., to the side of) light-emitting apertures 608 of the light sources 602.

Figure 6B:
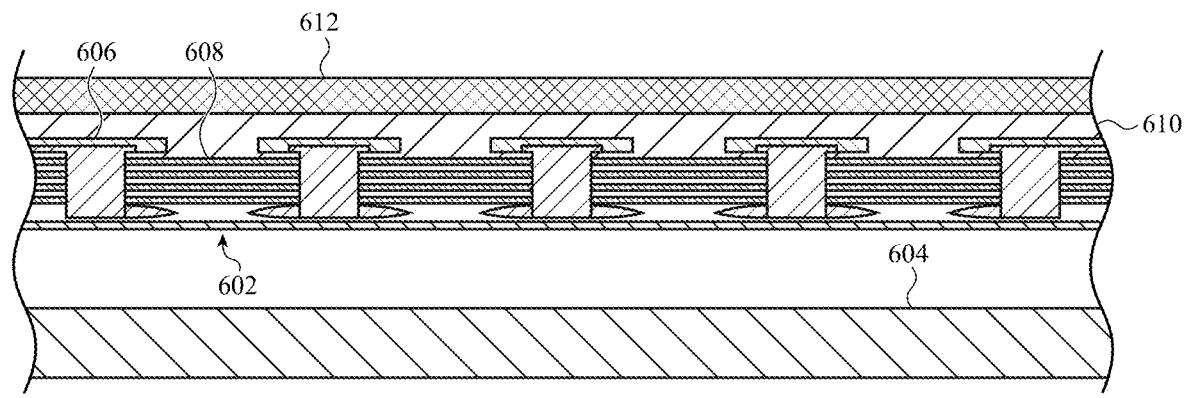

At block 504, and with reference to FIG. 6B, the method 500 may include depositing a first dielectric layer 610. In some cases, the first dielectric layer 610 may be deposited over an entirety of the top side (i.e., the light-emitting side) of the device shown in FIG. 6A. In some embodiments, the first dielectric layer 610 may be formed using a polymer or crystalline dielectric. As will be described with reference to later blocks, micro-lenses (e.g., a micro-lens array (MLA)) and saddle-shaped lenses may be formed in the first dielectric layer 610. Also at block 504, a photoresist (PR) layer 612 may be deposited on top of the first dielectric layer 610.

Figure 6C:
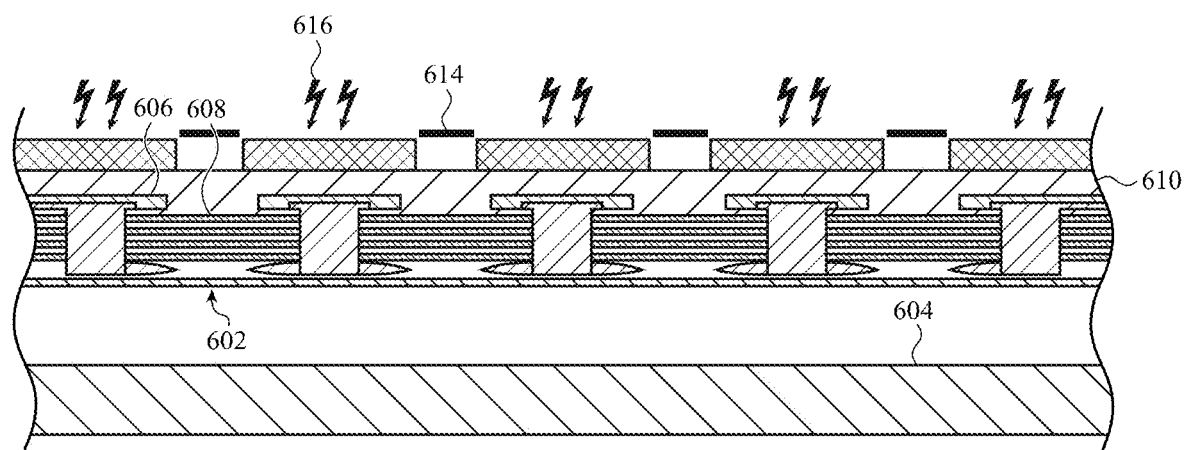

At block 506, and with reference to FIG. 6C, the method 500 may including placing a mask 614 over the PR layer 612, and exposing the exposed portions of the PR layer 612 to radiation 616 (e.g., thermal or optical radiation).

Figure 6D:
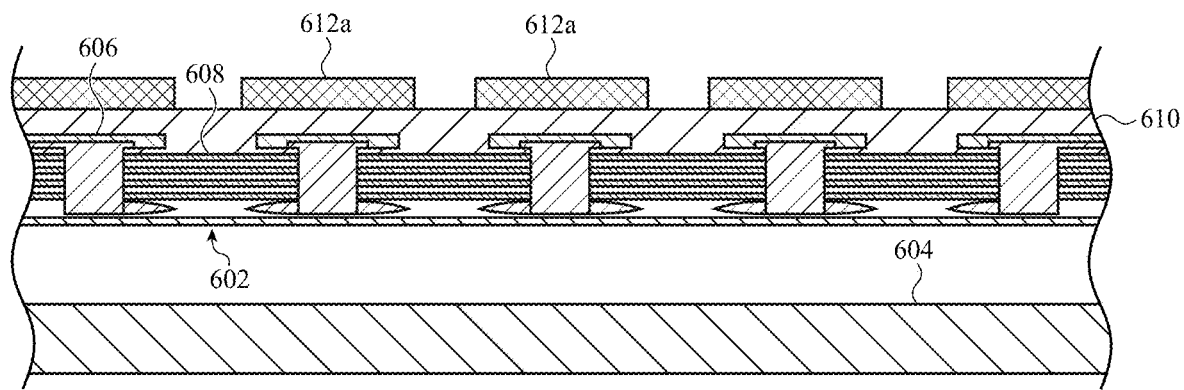

At block 508, and with reference to FIG. 6D, the method 500 may include etching the PR layer 612 to remove portions of the PR layer 612 that were exposed to radiation 616 at block 506. The etching may form a PR layer having a plurality of islands of PR material 612a, with the islands of PR material 612a positioned on opposite sides of the apertures 608 of the light sources 602. Although a positive PR material is described, the method 500 could alternately be modified to operate with a negative PR material.

Figure 6E:
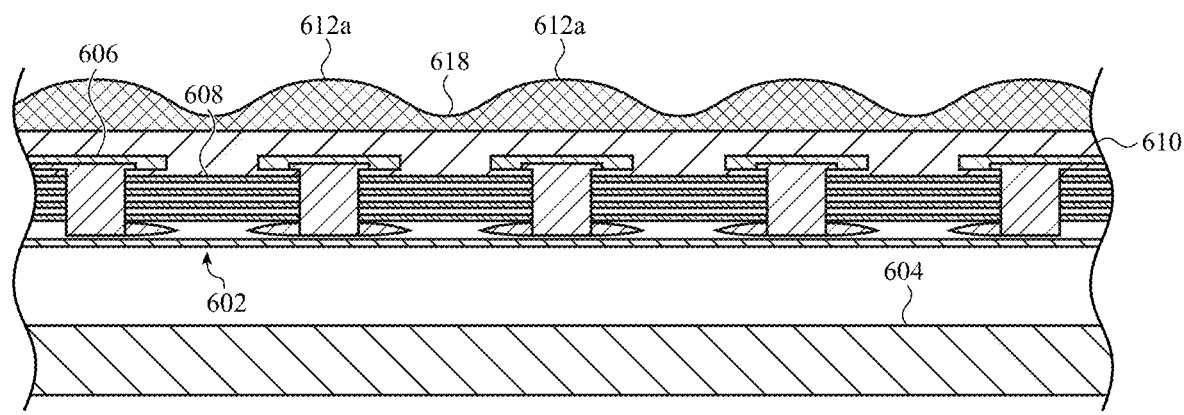

At block 510, and with reference to FIG. 6E, the method 500 may include subjecting the device to a thermal reflow process that causes the islands of PR material 612a to reflow. The reflow causes the edges of each island of PR material 612a to collapse, and causes the perimeter of each island of PR material 612a to enlarge such that adjacent islands of PR material 612a join at a plurality of cross-link features 618. The islands of PR material 612a are left with slumped or convex edges that join at the cross-link features 618.

Figure 6F:
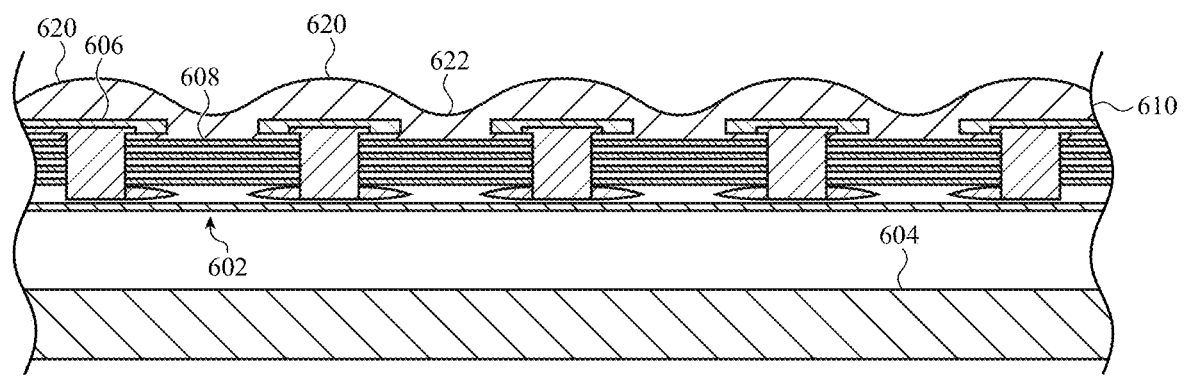

At block 512, and with reference to FIG. 6F, the method 500 may include replicating the top-side contour of the PR layer 612 to the dielectric layer 610. This produces a plurality of micro-lenses 620 joined by saddle-shaped lenses 622. The micro-lenses 620 are adjacent the apertures 608 of the light sources 602, and the saddle-shaped lenses 622 are over (e.g., aligned with) the apertures 608.

Figure 6G:
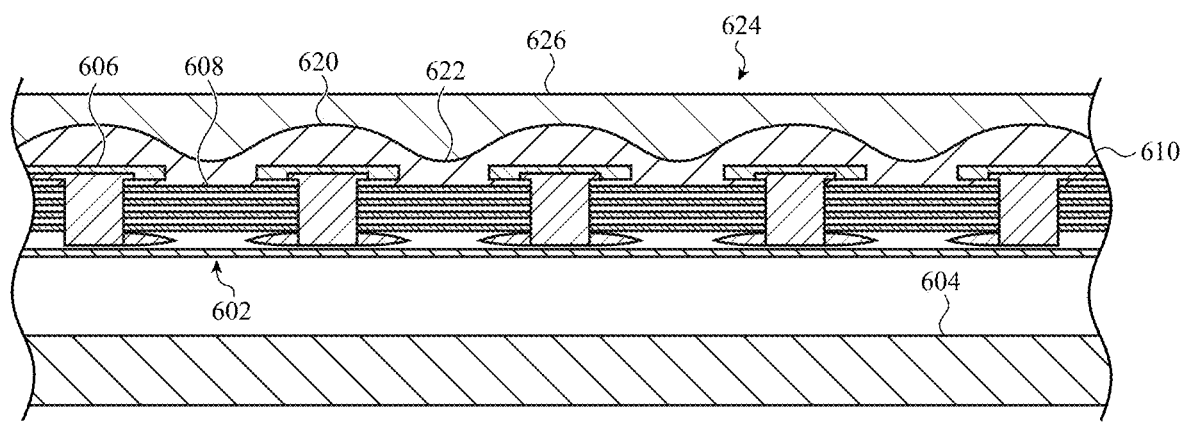

At block 514, and with reference to FIG. 6G, the method 500 may include depositing a second dielectric layer 624 on the first dielectric layer 610. The second dielectric layer 624 may have a higher refractive index than the first dielectric layer 610. In some embodiments, the second dielectric layer 624 may be formed using a polymer or crystalline dielectric. In some embodiments, the second dielectric layer 624 may be polished or reflowed to flatten the top-side surface 626 of the second dielectric layer 624. An anti-reflective (AR) coating may optionally be deposited on the second dielectric layer 624.

Figure 6H:
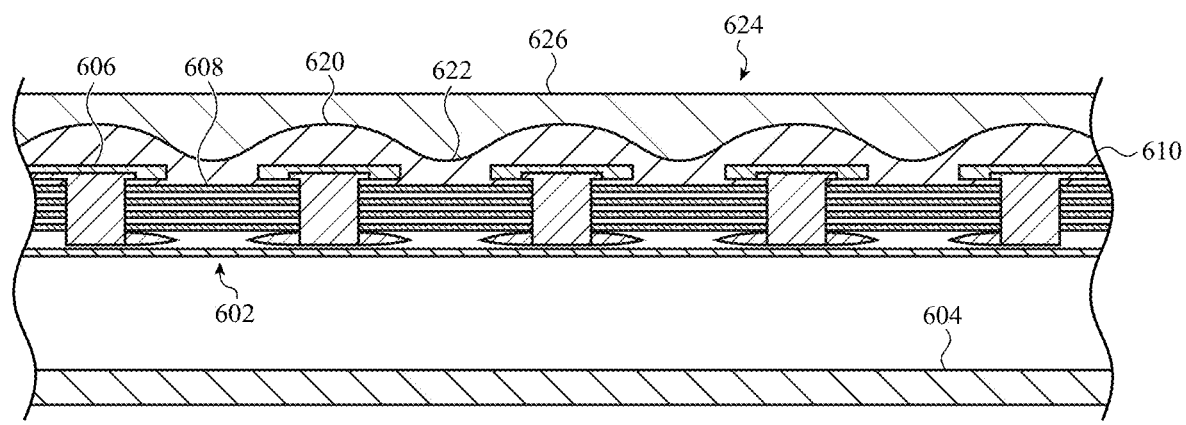

At block 516, and with reference to FIG. 6H, the method 500 may include a continuation of wafer processing, with an epi-thinning operation, back-side metal plating operation, or other operations.

In some embodiments of the method 500, one or more additional thermal reflow processes (or other processes) may be performed to introduce wafer-level optics components into the second dielectric layer 624 or other layers.

Figure 7:
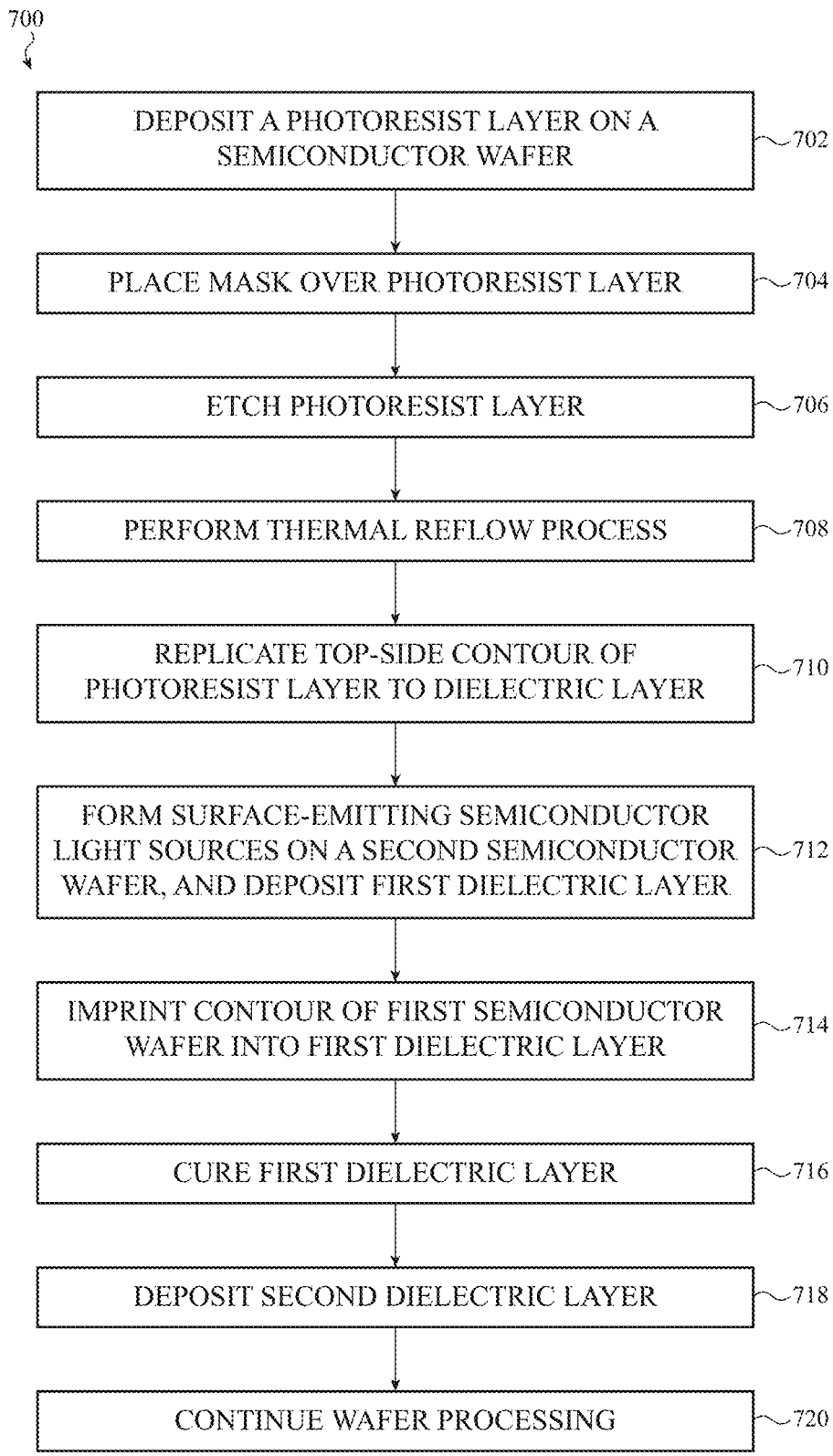
FIG. 7 shows a second example of a method for making a plurality of light-emitting devices, including, for example, the light-emitting device described with reference to FIG. 2 or 3A.

FIG. 7 shows a second example of a method 700 for making a plurality of light-emitting devices, including, for example, the light-emitting device described with reference to FIG. 2 or 3A. The light-emitting devices are formed on a wafer, using wafer-processing techniques. FIGS. 8A-8E show example cross-sections of a device used to make the light-emitting devices, and FIGS. 8F-8I show example cross-sections of various interim forms of the light-emitting devices, which interim forms of the light-emitting device may exist after performing the operation(s) included in various blocks of the method 700.

In blocks 702-710, a master patterning device 812 is formed. The master patterning device may be formed on a semiconductor wafer 802 (or, for example, a dielectric substrate, or a metal substrate). At block 702, and with reference to FIG. 8A, the method 700 may include depositing a PR layer 804 on the semiconductor wafer 802.

Figure 8A:
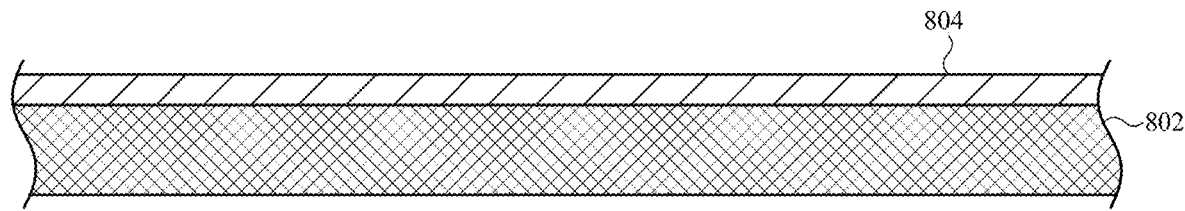
FIGS. 8A-8E show example cross-sections of a device used to make the light-emitting devices described with reference to FIG. 7, and FIGS. 8F-8I show example cross-sections of various interim forms of light-emitting devices, which interim forms of light-emitting devices may exist after performing the operation(s) included in various blocks of the method described with reference to FIG. 5.
Figure 8B:
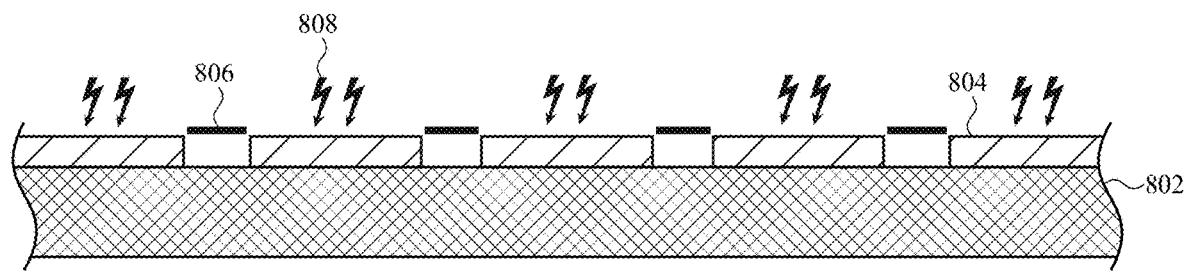

At block 704, and with reference to FIG. 8B, the method 700 may include placing a mask 806 over the PR layer 804, and exposing the PR layer 804 to radiation 808 (e.g., thermal or optical radiation).

Figure 8C:
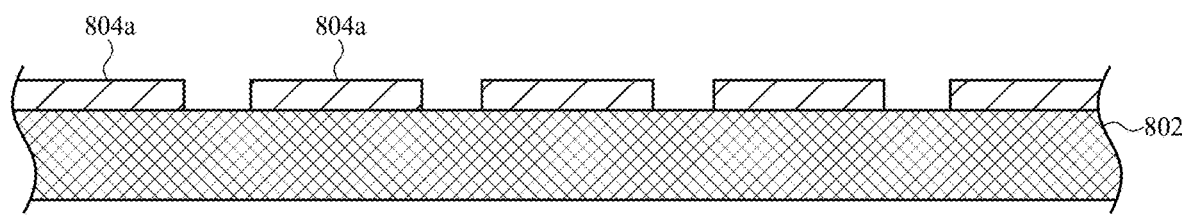

At block 706, and with reference to FIG. 8C, the method 700 may include etching the PR layer 804 to remove portions of the PR layer 804 that were exposed to radiation 808 at block 704. The etching may form a PR layer having a plurality of islands of PR material 804a, with the islands of PR material 804a. Although a positive PR material is described, the method 700 could alternately be modified to operate with a negative PR material.

Figure 8D:
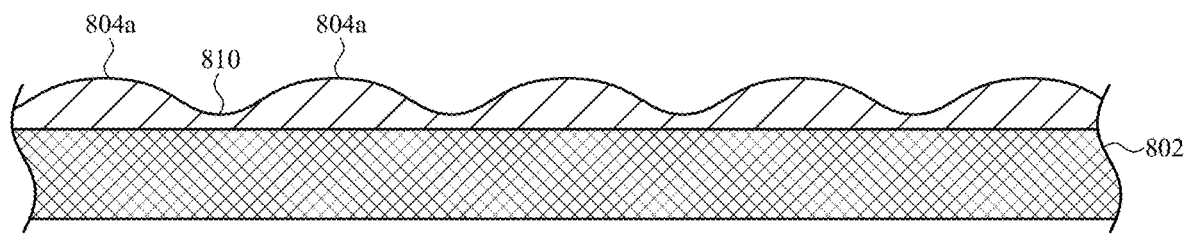

At block 708, and with reference to FIG. 8D, the method 700 may include subjecting the device to a thermal reflow process that causes the islands of PR material 804a to reflow. The reflow causes the edges of each island of PR material 804a to collapse, and causes the perimeter of each island of PR material 804a to enlarge such that adjacent islands of PR material 804a join at a plurality of cross-link features 810. The islands of PR material 804a are left with slumped or convex edges that join at the cross-link features 810.

Figure 8E:
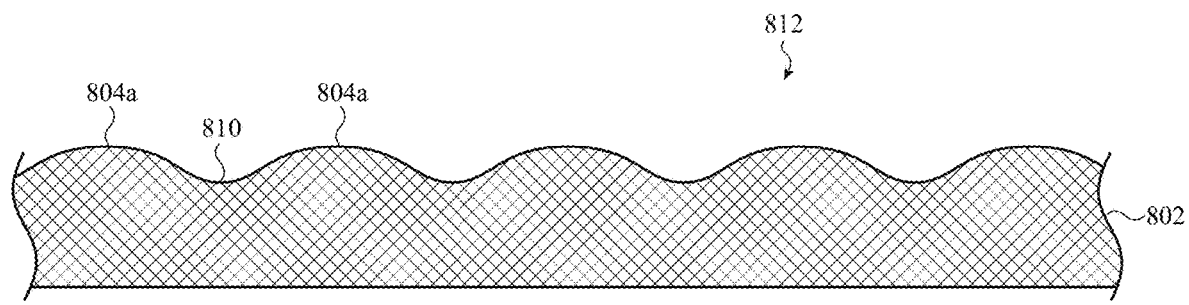

At block 710, and with reference to FIG. 8E, the method 700 may include replicating the top-side contour of the PR layer 804 to the semiconductor wafer 802. This produces the master patterning device 812, which may have a top-side contour that is the compliment of the contour of micro-lenses and saddle-shaped lenses desired in a light-emitting device.

Figure 8F:
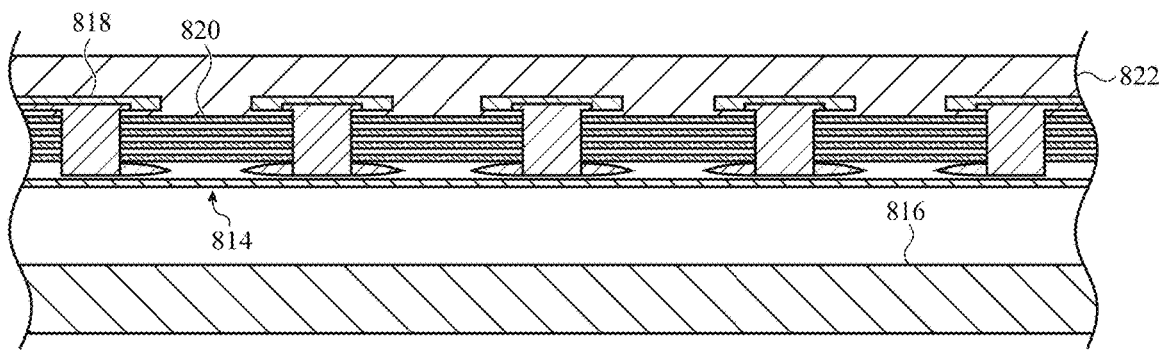

At block 712, and with reference to FIG. 8F, the method 700 may include forming a plurality of surface-emitting semiconductor light sources 814 on a semiconductor wafer 816 (i.e., on a second semiconductor wafer). The semiconductor light sources 814 may include, for example, VCSELs, VECSELs, OLEDs, RC-LEDs, mLEDs, or SLEDs. In some embodiments, formation of the light sources 814 may include (or conclude with) forming and patterning an electrically conductive top-side layer 818 (e.g., a gold (Au)). The top-side gold layer 818 may include contacts for driving the light sources 814. The contacts may be formed adjacent (e.g., to the side of) light-emitting apertures 820 of the light sources 814.

Also at block 712, the method 700 may include depositing a first dielectric layer 822. In some cases, the first dielectric layer 822 may be deposited over an entirety of the top side (i.e., the light-emitting side) of the semiconductor wafer 816. In some embodiments, the first dielectric layer 822 may be formed using a polymer or crystalline dielectric. As will be described with reference to later blocks, micro-lenses (e.g., an MLA) and saddle-shaped lenses may be formed in the first dielectric layer 822.

Figure 8G:
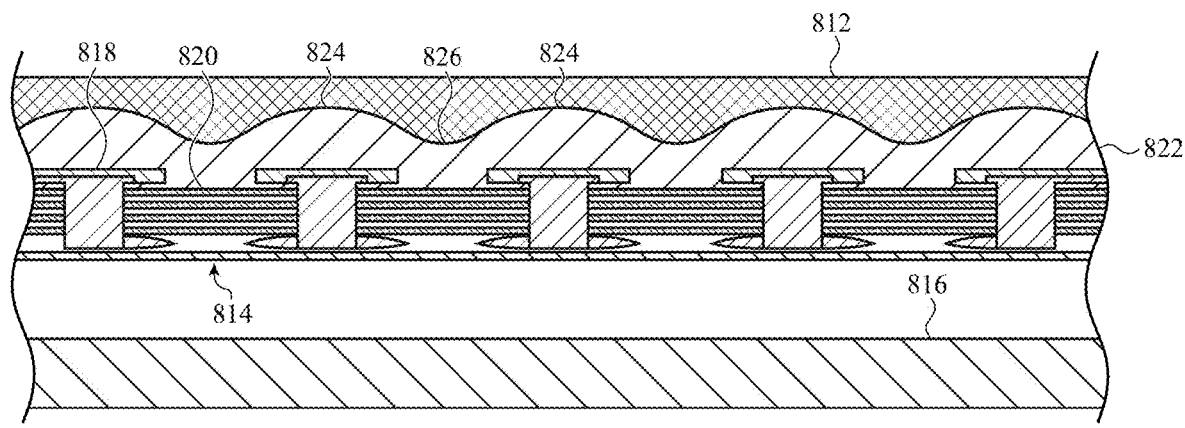

At block 714, and with reference to FIG. 8G, the method 700 may include imprinting (e.g., negatively imprinting) the shaped contour of the master patterning 812 device into the first dielectric layer 822. This produces a plurality of micro-lenses 824 joined by saddle-shaped lenses 826. The micro-lenses 824 are adjacent the apertures 820 of the light sources 814, and the saddle-shaped lenses 826 are over (e.g., aligned with) the apertures 820.

Figure 8H:
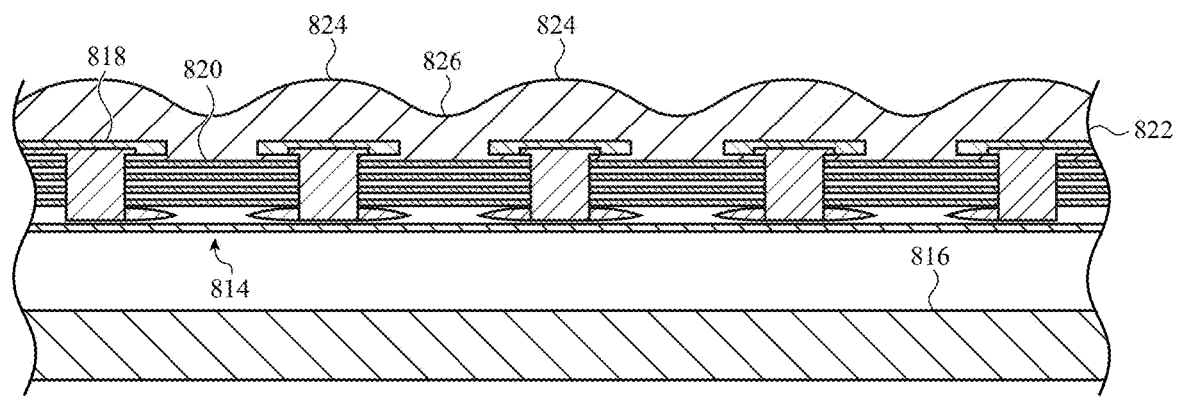

At block 716, and with reference to FIG. 8H, the method 700 may include curing the first dielectric layer 822.

Figure 8I:
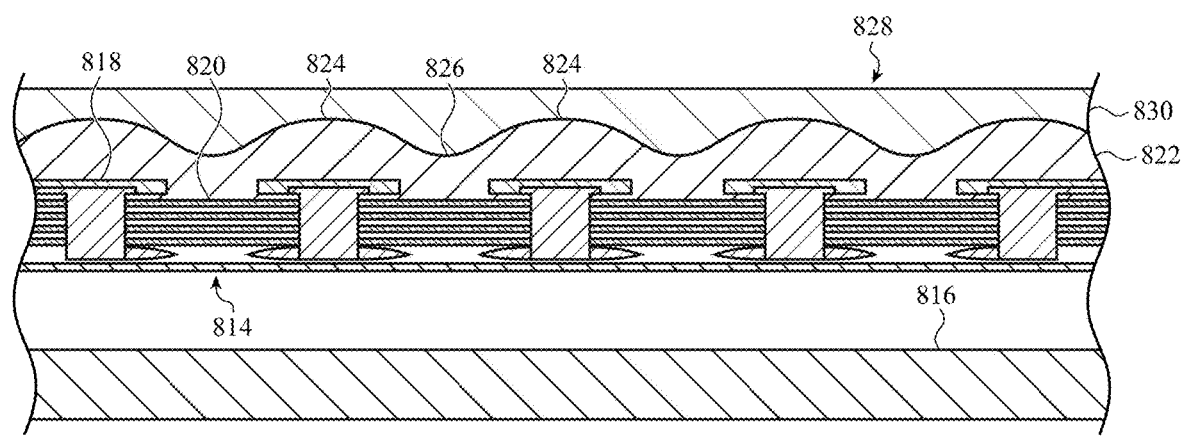

At block 718, and with reference to FIG. 8I, the method 700 may include depositing a second dielectric layer 828 on the first dielectric layer 822. The second dielectric layer 828 may have a higher refractive index than the first dielectric layer 822. In some embodiments, the second dielectric layer 828 may be formed using a polymer or crystalline dielectric. In some embodiments, the second dielectric layer 828 may be polished or reflowed to flatten the top-side surface 830 of the second dielectric layer 828. An AR coating may optionally be deposited on the second dielectric layer 828.

At block 720, the method 700 may include a continuation of wafer processing, with an epi-thinning operation, back-side metal plating operation, or other operations.

In some embodiments of the method 700, one or more additional patterning or thermal reflow processes (or other processes) may be performed to introduce wafer-level optics components into the second dielectric layer 828 or other layers.

In each of the methods 500 and 700, a saddle-shaped lens 622 or 826 is formed on a functional surface-emitting semiconductor light source 602 or 814 epi structure using wafer-level processing steps such as the etching and thermal reflow of a PR layer to produce thermally reflowed and cross-linked islands of PR material.

Figure 9:
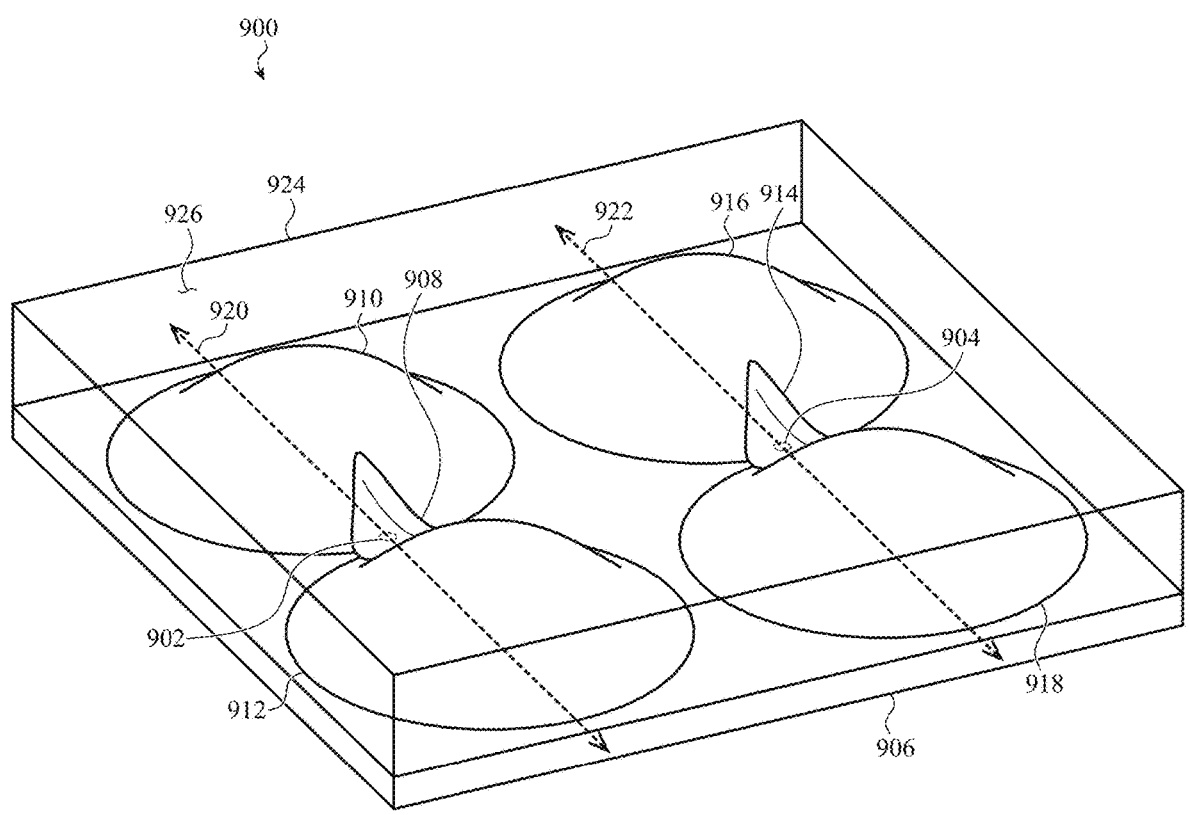
FIG. 9 shows a light-emitting device having two light sources.
Figure 10:
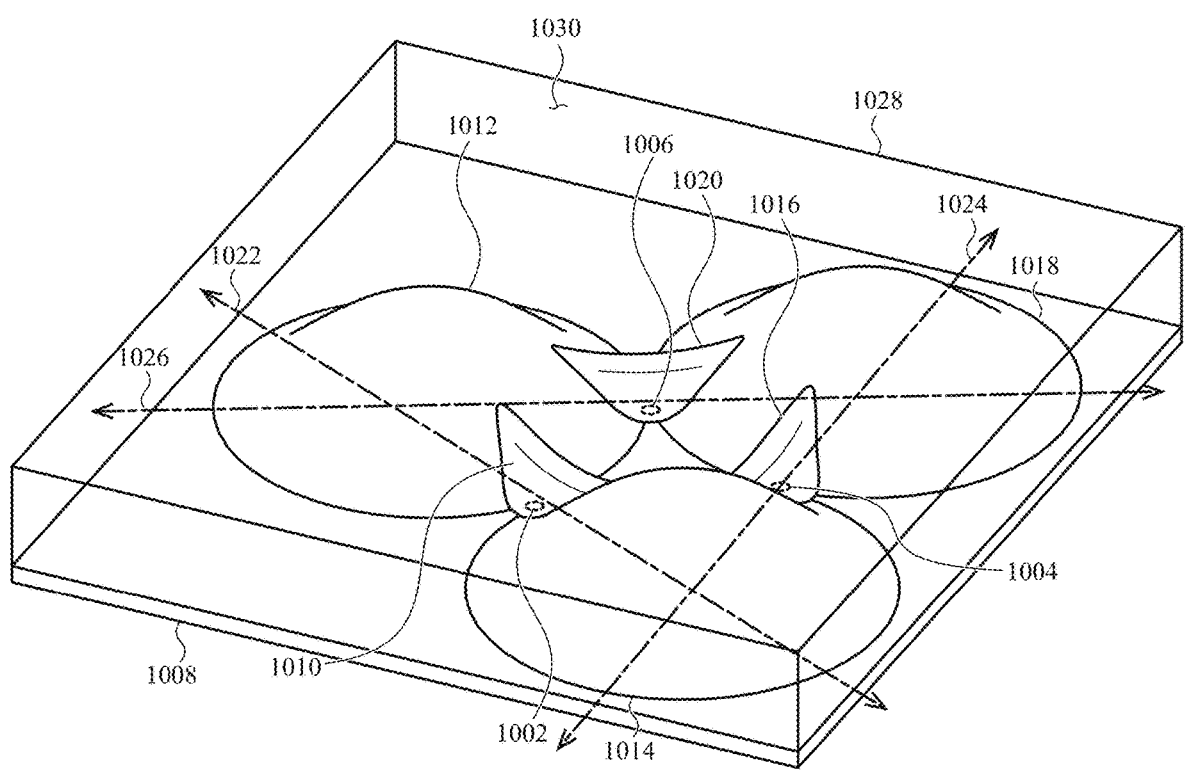
FIG. 10 shows a light-emitting device having three light sources.

FIGS. 9 and 10 show light-emitting devices including a set of light sources (e.g., a set of surface-emitting semiconductor light sources).

FIG. 9 shows a light-emitting device 900 having two light sources 902, 904 (e.g., two surface-emitting semiconductor light sources). The light-emitting device 900 may be used as a light source in any of the devices described with reference to FIGS. 1A-1D. The two light sources 902, 904 may be formed on a set of one or more semiconductor substrates (e.g., one or more semiconductor die diced from a semiconductor wafer). For example, the light sources 902, 904 may be formed on a common semiconductor die 906, or the light sources 902, 904 may be formed on different semiconductor die (e.g., different semiconductor die diced from the same or different semiconductor wafers) and mounted in close proximity to one another on an additional semiconductor or other substrate.

A first saddle-shaped lens 908 may extend between a first pair of micro-lenses (e.g., a first micro-lens 910 and a second micro-lens 912) and be positioned over a first aperture of the first light source 902. A second saddle-shaped lens 914 may extend between a second pair of micro-lenses (e.g., a third micro-lens 916 and a fourth micro-lens 918) and be positioned over a second aperture of the second light source 904. Alternatively, the different pairs of micro-lenses may share a micro-lens, thereby eliminating a micro-lens (e.g., the first saddle-shaped lens 908 may extend between first and second micro-lenses, and the second saddle-shaped lens 914 may extend between the second micro-lens and a third micro-lens). In the latter case, the micro-lenses and saddle-shaped lenses 908, 914 may form a monolithic dielectric.

Each saddle-shaped lens 908, 914 may have different contours/curvatures in orthogonal directions, and may reshape a beam of light emitted by one of the light sources 902, 904 to have a high aspect ratio. In some embodiments, the saddle-shaped lenses 908, 914 may have different angular orientations. That is, a first axis 920 oriented along a length of the first saddle-shaped lens 908 may intersect a second axis 922 oriented along a length of the second saddle-shaped lens 914 (not shown). The first and second axes 920, 922 may be perpendicular to one another, or may intersect at an angle other than a right angle. In some embodiments, the first and second saddle lenses 908, 914 may be de-centered along the axes 920, 922 by different amounts from their corresponding emitter apertures 902, 904, to steer their respective high-aspect ratio beams in their low divergence/collimated directions to occupy/stitch different far field spaces.

Each of the micro-lenses 910, 912, 916, 918 and saddle-shaped lenses 908, 914 may be formed from a dielectric that is transparent to light emitted by the first and second light sources 902, 904 (e.g., transparent to one or more, or all, wavelengths of light emitted by the light sources 902, 904). In some embodiments, each light source 902, 904 may emit coherent light having only a single wavelength. A second dielectric 924 may encapsulate each of the saddle-shaped lenses 908, 914. The second dielectric 924 may have a higher refractive index than the dielectric from which the micro-lenses 910, 912, 916, 918 and saddle-shaped lenses 908, 914 are formed, and may encapsulate the light emission surfaces of the saddle-shaped lenses 908, 914. In some embodiments, the second dielectric 924 may also encapsulate the micro-lenses 910, 912, 916, 918. The second dielectric 924 may also be transparent to light emitted by the light sources 902, 904 (e.g., transparent to one or more, or all, wavelengths of light emitted by the light sources 902, 904), and may prevent light emitted by the light sources 902, 904 from experiencing total internal reflection within the saddle-shaped lenses 908, 914. The second dielectric 924 may have a light emission surface 926 parallel to the surface of the semiconductor die 906 that contains the apertures of the light sources 902, 904 (i.e., parallel to an aperture-containing surface of the semiconductor die 906).

In some embodiments, each of the micro-lenses 910, 912, 916, 918 and saddle-shaped lenses 908, 914 may be formed using a same first dielectric, and encapsulated using a same second dielectric 924. In other embodiments, different pairs of micro-lenses and the saddle-shaped lens that connects them may be formed of different dielectrics and/or different pairs of micro-lenses and the saddle-shaped lens that connects them may be encapsulated by different dielectrics.

In some embodiments, the saddle-shaped lenses 908, 914 may have the same aspect ratio. In other embodiments, the saddle-shaped lenses 908, 914 may have different aspect ratios. The light sources 902, 904 may emit the same or different wavelengths (or colors) of light, or emit the same or different type of electromagnetic radiation.

A controller may turn the light sources 902, 904 on and off (i.e., activate and deactivate the light sources) alternately, sequentially, or simultaneously. To enable the light sources 902, 904 to be turned on and off alternately or sequentially, the drive circuits and electrical contacts for the light sources 902, 904 may be configured to be individually addressable. When the light sources 902, 904 are positioned in close proximity to one another and turned on and off at different times, in an alternating manner (e.g., when the first light source 902 is turned on while the second light source 904 is off, then the second light source 904 is turned on while the first light source 902 is off), the beams of light emitted by the light sources 902, 904 may simulate a single, rotating, high aspect ratio, beam of light at a far field.

Alternatively, when the light sources 902, 904 are positioned in close proximity to one another, a selected one of the light sources 902, 904 may be turned on to angularly tune an orientation of a single, high aspect ratio, beam of light at a far field (e.g., to provide on-demand/angularly tunable high aspect ratio illumination).

In some embodiments, the set of beams emitted by the light sources 902, 904 may be received and shaped by a same optical element (or set of optical elements) in a near field. For example, the set of beams may be received and shaped by a cone lens.

When a plurality of light-emitting devices are constructed as described with reference to FIG. 9, and the light-emitting devices are mounted in an array, the light-emitting devices may be operated (e.g., by a controller) in the same or different manners.

FIG. 10 shows a light-emitting device 1000 having three light sources 1002, 1004, 1006 (e.g., three surface-emitting semiconductor light sources). The light-emitting device 1000 may be used as a light source in any of the devices described with reference to FIGS. 1A-1D. The three light sources 1002, 1004, 1006 may be formed on a set of one or more semiconductor substrates (e.g., one or more semiconductor die diced from a semiconductor wafer). For example, the light sources 1002, 1004, 1006 may be formed on a common semiconductor die 1008, or the light sources 1002, 1004, 1006 may be formed on different semiconductor die (e.g., different semiconductor die diced from the same or different semiconductor wafers) and mounted in close proximity to one another on an additional semiconductor or other substrate.

A first saddle-shaped lens 1010 may extend between a first pair of micro-lenses (e.g., a first micro-lens 1012 and a second micro-lens 1014) and be positioned over a first aperture of the first light source 1002. A second saddle-shaped lens 1016 may extend between a second pair of micro-lenses (e.g., the second micro-lens 1014 and a third micro-lens 1018) and be positioned over a second aperture of the second light source 1004. A third saddle-shaped lens 1020 may extend between a third pair of micro-lenses (e.g., the first micro-lens 1012 and the third micro-lens 1018) and be positioned over a third aperture of the third light source 1006. As shown, the micro-lenses 1012, 1014, 1018 and saddle-shaped lenses 1010, 1016, 1020 may form a monolithic dielectric. Alternatively, two or more pairs of the micro-lenses may not share a micro-lens (e.g., the first saddle-shaped lens may extend between first and second micro-lenses, the second saddle-shaped lens may extend between third and fourth micro-lenses, and the third saddle-shaped lens may extend between fifth and sixth micro-lenses).

Each saddle-shaped lens 1010, 1016, 1020 may be constructed similarly to one of the saddle-shaped lenses described with reference to FIG. 9, and may have a different angular orientation than the other saddle-shaped lenses 1010, 1016, 1020. That is, a first axis 1022 oriented along a length of the first saddle-shaped lens 1010 may intersect a second axis 1024 oriented along a length of the second saddle-shaped lens 1016, and a third axis 1026 oriented along a length of the third saddle-shaped lens 1020 may intersect both the first axis 1022 and the second axis 1024. Each of the saddle-shaped lenses 1010, 1016, 1020 may reshape a beam of light to have a greatest divergence along its width. In some embodiments, each of the first, second, and third axes 1022, 1024, 1026 may be rotated 60 degrees with respect to each of the other axes 1022, 1024, 1026 (e.g., each of the axes 1022, 1024, 1026 may define a different side of an equilateral triangle). Alternatively, the first, second, and third axes 1022, 1024, 1026 may intersect each other at other angles (e.g., the light sources 1002, 1004, 1006 and saddle-shaped lenses 1010, 1016, 1020 may be positioned along edges of a hexagon or other shape. Alternatively, one or more of the light sources 1002, 1004, 1006 may be offset from the axis 1022, 1024, of 1026 of its saddle-shaped lens 1010, 1016, or 1020.

Each of the micro-lenses 1012, 1014, 1018 and saddle-shaped lenses 1010, 1016, 1020 may be formed from a dielectric that is transparent to light emitted by the first, second, and third light sources 1002, 1004, 1006 (e.g., transparent to one or more, or all, wavelengths of light emitted by the light sources 1002, 1004, 1006). In some embodiments, each light source 1002, 1004, 1006 may emit coherent light having only a single wavelength. A second dielectric 1028 may encapsulate each of the saddle-shaped lenses 1010, 1016, 1020. The second dielectric 1028 may have a higher refractive index than the dielectric from which the micro-lenses 1012, 1014, 1018 and saddle-shaped lenses 1010, 1016, 1020 are formed, and may encapsulate the light emission surfaces of the saddle-shaped lenses 1010, 1016, 1020. In some embodiments, the second dielectric 1028 may also encapsulate the micro-lenses 1012, 1014, 1018. The second dielectric 1028 may also be transparent to light emitted by the light sources 1002, 1004, 1006 (e.g., transparent to one or more, or all, wavelengths of light emitted by the light sources 1002, 1004, 1006), and may prevent light emitted by the light sources 1002, 1004, 1006 from experiencing total internal reflection within the saddle-shaped lenses 1010, 1016, 1020. The second dielectric 1028 may have a light emission surface 1030 parallel to the surface of the semiconductor die 1008 that contains the apertures of the light sources 1002, 1004, 1006 (i.e., parallel to an aperture-containing surface of the semiconductor die 1008).

In some embodiments, the saddle-shaped lenses 1010, 1016, 1020 may have the same aspect ratio. In other embodiments, the saddle-shaped lenses 1010, 1016, 1020 may have different aspect ratios. The light sources 1002, 1004, 1006 may emit the same or different wavelengths (or colors) of light, or emit the same or different type of electromagnetic radiation.

A controller may turn the light sources 1002, 1004, 1006 on and off (i.e., activate and deactivate the light sources 1002, 1004, 1006) alternately, sequentially, or simultaneously. To enable the light sources 1002, 1004, 1006 to be turned on and off alternately or sequentially, the drive circuits for the light sources 1002, 1004, 1006 may be configured to be individually addressable. When the light sources 1002, 1004, 1006 are positioned in close proximity to one another and turned on and off at different times, in an alternating manner (e.g., when the first light source 1002 is turned on while the second and third light sources 1004, 1006 are off, then the second light source 1004 is turned on while the first and third light sources 1002, 1006 are off, then the third light source 1006 is turned on while the first and second light sources 1002, 1004 are off), the beams of light emitted by the light sources 1002, 1004, 1006 may simulate a single, rotating, high aspect ratio, beam of light at a far field.

Alternatively, when the light sources 1002, 1004, 1006 are positioned in close proximity to one another, a selected one of the light sources 1002, 1004, 1006 may be turned on to angularly tune an orientation of a single, high aspect ratio, beam of light at a far field (e.g., to provide on-demand/angularly tunable high aspect ratio illumination).

In some embodiments, the set of beams emitted by the light sources 1002, 1004, 1006 may be received and shaped by a same optical element (or set of optical elements) in a near field. For example, the set of beams may be received and shaped by a cone lens.

When a plurality of light-emitting devices are constructed as described with reference to FIG. 10, and the light-emitting devices are mounted in an array, the light-emitting devices may be operated (e.g., by a controller) in the same or different manners.

Figure 11A:
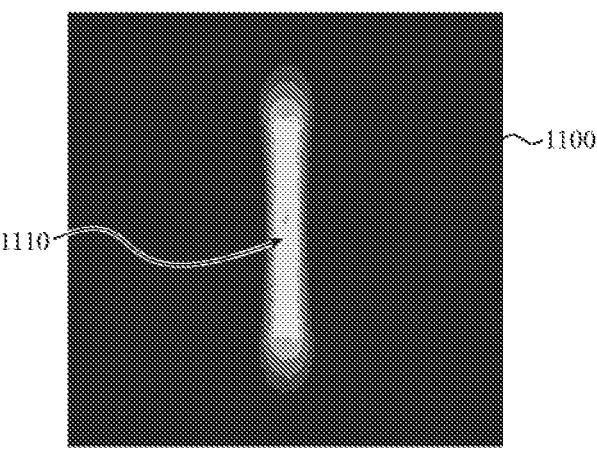
FIGS. 11A-11D depict an illumination provided by the light-emitting device described with reference to FIG. 10, in a far-field plane, when light sources are positioned in close proximity to one another and turned on and off at different times, in an alternating manner.
Figure 11B:
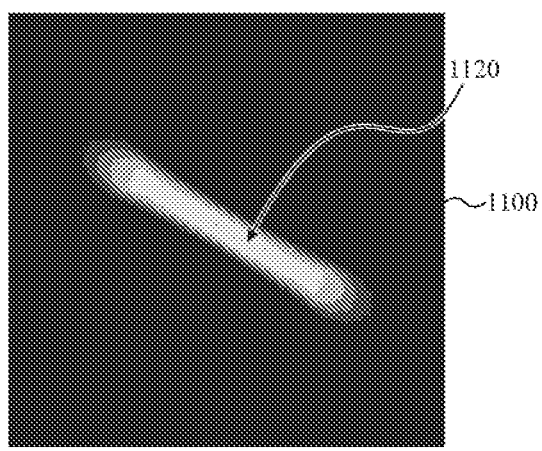
Figure 11C:
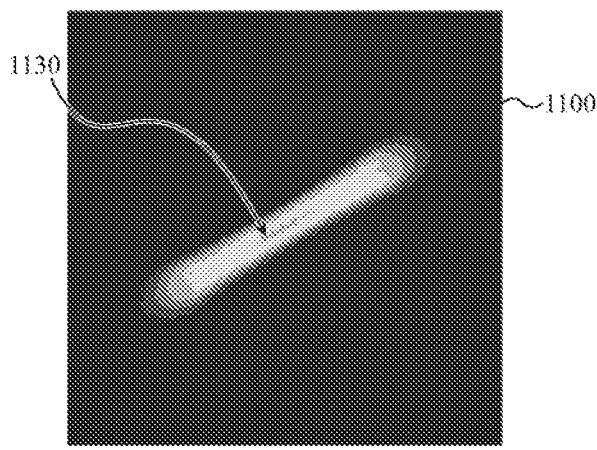
Figure 11D:
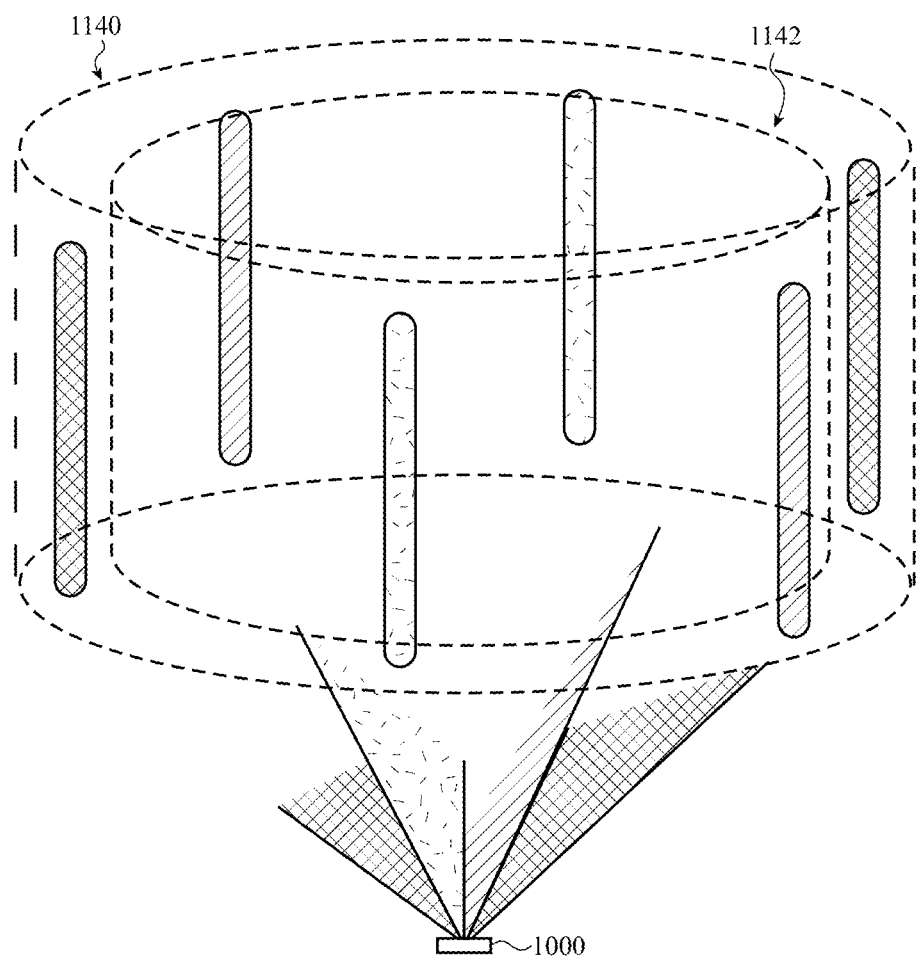

FIGS. 11A-11C depict an illumination provided by the light-emitting device 1000 described with reference to FIG. 10, in a far-field plane 1100, when the light sources 1002, 1004, 1006 are positioned in close proximity to one another and turned on and off at different times, in an alternating manner. FIG. 11A illustrates the illumination 1110 provided by the light-emitting device 1000, in the far-field plane 1100, when only the first light source 1002 is turned on. FIG. 11B illustrates the illumination 1120 provided by the light-emitting device 1000, in the far-field plane 1100, when only the second light source 1004 is turned on. FIG. 11C illustrates the illumination 1130 provided by the light-emitting device 1000, in the far-field plane 1100, when only the third light source 1006 is turned on. FIG. 11D illustrates a panorama 1140 of the illumination provided by the light-emitting device 1000, and an element such as a panoramic optical lens 1142 or mirror that converts the angular rotation of the beams of light emitted from the saddle-shaped lenses 1010, 1016, 1020 to a panoramic projection. The light-emitting device 1000 may be referred to, in some embodiments, as a panoramic beam scanner when operated as described with reference to FIGS. 11A-11D.

Figure 12A:
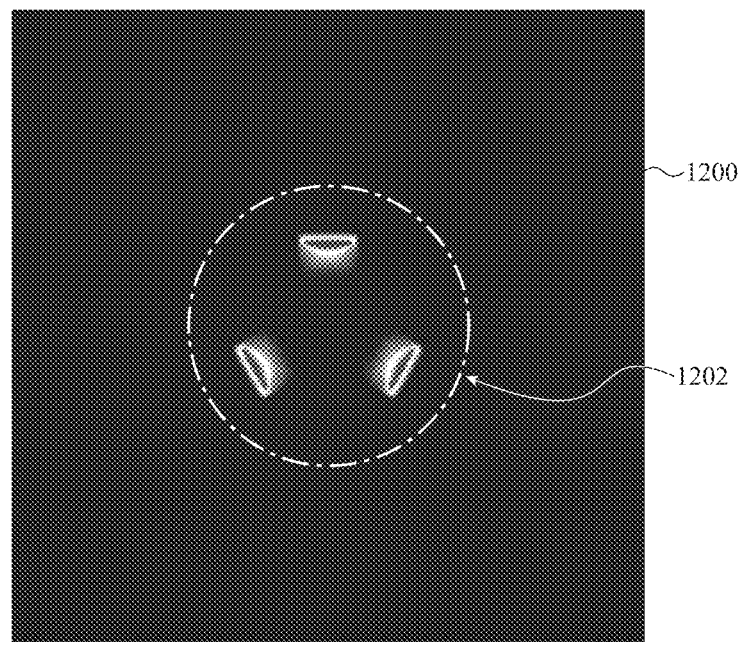
FIGS. 12A and 12B depict an illumination provided by the light-emitting device described with reference to FIG. 10, in different far-field planes, when light sources are positioned in close proximity to one another and turned on simultaneously.
Figure 12B:
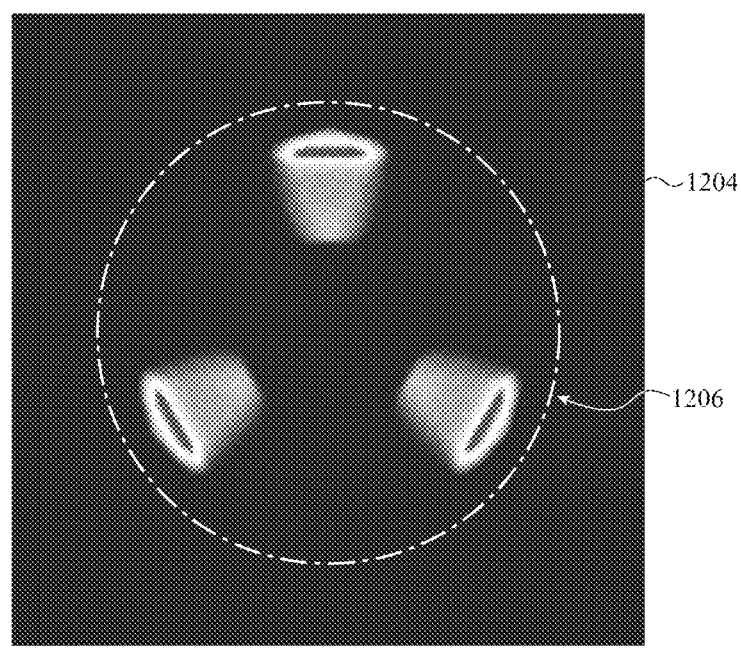

FIGS. 12A and 12B depict an illumination provided by the light-emitting device 1000 described with reference to FIG. 10, in different far-field planes 1200, 1204, when the light sources 1002, 1004, 1006 are positioned in close proximity to one another and turned on simultaneously. In some embodiments, the high aspect ratio near-field beam patterns of the light-emitting device 1000 are fed to an image optical system that projects the high aspect ratio near-field beam patterns into far-field space. FIG. 12A illustrates the illumination 1202 provided by the light-emitting device 1000 in a first far-field plane 1200 (e.g., in a far-field plane positioned 1 meter (m) from the light-emitting device 1000). FIG. 12B illustrates the illumination 1206 provided by the light-emitting device 1000 in a second far-field plane 1204 (e.g., in a far-field plane positioned 2 m from the light-emitting device), with the second far-field plane 1204 being farther from the light-emitting device 1000 than the first far-field plane 1200.

The light shown in FIGS. 12A and 12B may be referred to as structured light. When a light-emitting device such as the light-emitting device 1000 emits structured light, it adds additional degrees-of-freedom (DOF) in both aspect ratio and orientation. For example, depending on the depth of field and aberration of a system including the light-emitting device 1000, the structured light may be inherently encoded with depth information, which depth information can be determined from the size and shape of the structured light when projected on a particular far-field plane (e.g., far-field plane 1200 or 1204). The structured light is also inherently encoded with angular orientation information, because the shapes and sizes of the spots attributable to different light sources, and the relationships between the shapes and sizes, will change when the light-emitting device 1000 is oriented at different angles with respect to a far-field plane. Traditional structured light grid patterns have been arranged in spatial tiles of locally unique collections of pseudo-random positioning of identical isolated light beam spots. High resolution depth information was then retrieved by an imaging system capturing the disparity of spot positioning intercepted by a three-dimensional (3D) surface. The additional shape DOF shown in FIGS. 12A and 12B (orientation and aspect ratio of isolated brightness patterns) can facilitate faster and more reliable structured light capturing and higher resolution depth information retrieval. The light patterns shown in FIGS. 12A and 12B may be referred to as angular-variant high aspect ratio spatially structured light.

Figure 13:
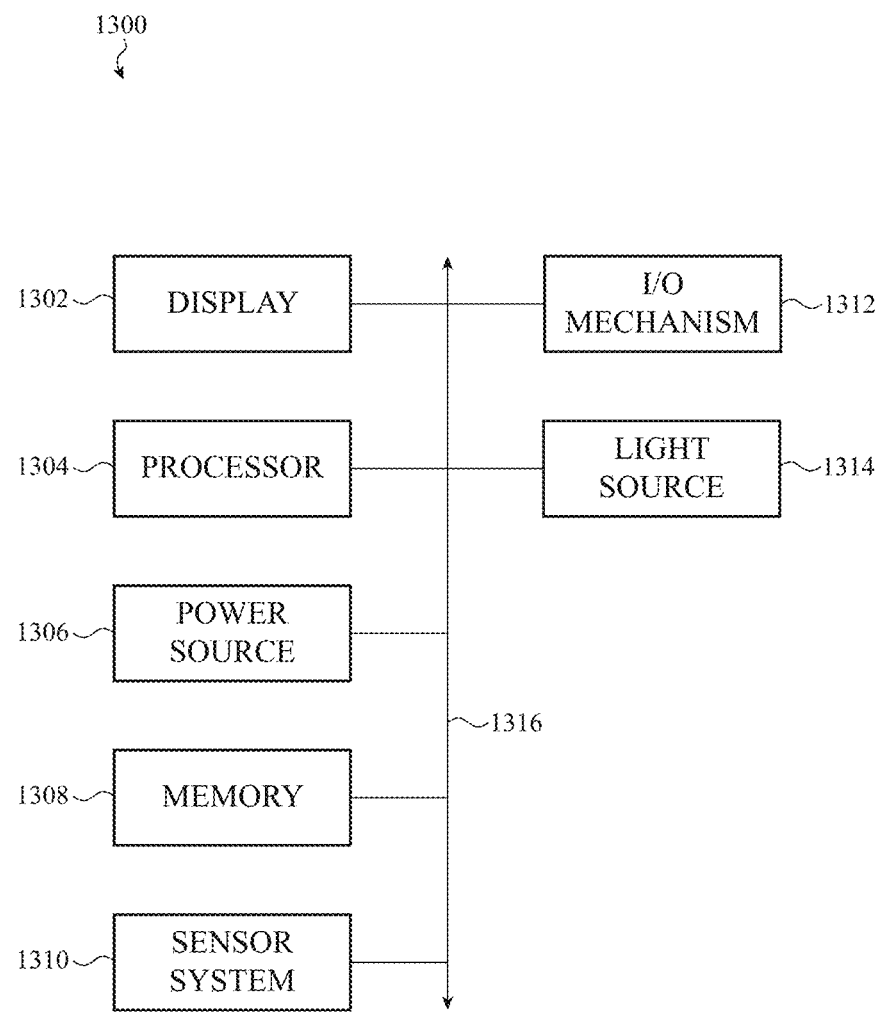
FIG. 13 shows a sample electrical block diagram of an electronic device, which electronic device may in some cases take the form of one of the devices described with reference to FIGS. 1A-1D.

FIG. 13 shows a sample electrical block diagram of an electronic device 1300, which electronic device may in some cases take the form of one of the devices described with reference to FIGS. 1A-1D. The electronic device 1300 may include a display 1302 (e.g., a light-emitting display), a processor 1304, a power source 1306, a memory 1308 or storage device, a sensor system 1310, an input/output (I/O) mechanism 1312 (e.g., an input/output device, input/output port, or haptic input/output interface), or a light source 1314. The processor 1304 may control some or all of the operations of the electronic device 1300. The processor 1304 may communicate, either directly or indirectly, with some or all of the other components of the electronic device 1300. For example, a system bus or other communication mechanism 1316 can provide communication between the processor 1304, the power source 1306, the memory 1308, the sensor system 1310, the I/O mechanism 1312, and the light source 1314.

The processor 1304 may be implemented as any electronic device capable of processing, receiving, or transmitting data or instructions, whether such data or instructions is in the form of software or firmware or otherwise encoded. For example, the processor 1304 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some embodiments, the processor 1304 may function as the controller described with reference to FIG. 9 or 10.

It should be noted that the components of the electronic device 1300 can be controlled by multiple processors. For example, select components of the electronic device 1300 (e.g., a sensor system 1310 or light source 1314) may be controlled by a first processor and other components of the electronic device 1300 (e.g., the display 1302) may be controlled by a second processor, where the first and second processors may or may not be in communication with each other.

The power source 1306 can be implemented with any device capable of providing energy to the electronic device 1300. For example, the power source 1306 may include one or more batteries or rechargeable batteries. Additionally or alternatively, the power source 1306 may include a power connector or power cord that connects the electronic device 1300 to another power source, such as a wall outlet.

The memory 1308 may store electronic data that can be used by the electronic device 1300. For example, the memory 1308 may store electrical data or content such as, for example, audio and video files, documents and applications, device settings and user preferences, timing signals, control signals, and data structures or databases. The memory 1308 may include any type of memory. By way of example only, the memory 1308 may include random access memory, read-only memory, Flash memory, removable memory, other types of storage elements, or combinations of such memory types.

The electronic device 1300 may also include one or more sensor systems 1310 positioned almost anywhere on the electronic device 1300. The sensor system(s) 1310 may be configured to sense one or more type of parameters, such as but not limited to, pressure on the display 1302, a crown, a button, or a housing of the electronic device 1300; light; touch; heat; movement; relative motion; biometric data (e.g., biological parameters) of a user; and so on. For example, the sensor system(s) 1310 may include a watch crown sensor system, a heat sensor, a position sensor, a light or optical sensor, an accelerometer, a pressure transducer, a gyroscope, a magnetometer, a health monitoring sensor, and so on. Additionally, the one or more sensor systems 1310 may utilize any suitable sensing technology, including, but not limited to, capacitive, ultrasonic, resistive, optical, ultrasound, piezoelectric, and thermal sensing technology. In some examples, the sensor system(s) 1310 may include one or more of the sensor systems described herein.

The I/O mechanism 1312 may transmit or receive data from a user or another electronic device. The I/O mechanism 1312 may include a display, a touch sensing input surface, a crown, one or more buttons (e.g., a graphical user interface "home" button), one or more cameras, one or more microphones or speakers, one or more ports such as a microphone port, and/or a keyboard. Additionally or alternatively, the I/O mechanism 1312 may transmit electronic signals via a communications network, such as a wireless and/or wired network connection. Examples of wireless and wired network connections include, but are not limited to, cellular, Wi-Fi, Bluetooth, IR, and Ethernet connections.

The light source 1314 may include any of the light-emitting devices described herein.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A light-emitting device, comprising:
   a semiconductor substrate;
   a surface-emitting semiconductor light source on the semiconductor substrate;
   a monolithic first dielectric, transparent to light emitted by the light source, comprising:
   first and second micro-lenses adjacent an aperture of the light source and having axes parallel to and offset from an axis of a beam of light emitted by the light source; and
   a saddle-shaped lens over the aperture of the light source, the saddle-shaped lens connecting the first and second micro-lenses and reshaping the beam of light emitted by the light source to have a high aspect ratio; and
   a second dielectric, transparent to light emitted by the light source, encapsulating a light emission surface of the saddle-shaped lens; wherein:
   the second dielectric has a higher refractive index than the monolithic first dielectric.

2. The light-emitting device of claim 1, wherein:
   the light source comprises a vertical-cavity surface-emitting laser (VCSEL);
   the saddle-shaped lens reshapes the beam of light emitted by the VCSEL to have a beam divergence of greater than or equal to 120 degrees in a first plane including the axis of the beam of light, and less than or equal to 20 degrees in a second plane including the axis of the beam of light;
the first plane is perpendicular to the second plane; and
the second dielectric has a light emission surface parallel to a surface of the semiconductor substrate containing the aperture.

3. The light-emitting device of claim 1, wherein the second dielectric has a light emission surface parallel to a surface of the semiconductor substrate containing the aperture.

4. The light-emitting device of claim 1, wherein:
the saddle-shaped lens reshapes the beam of light emitted by the light source to have a beam divergence of greater than or equal to 120 degrees in a first direction, and less than or equal to 20 degrees in a second direction; and
the first direction is perpendicular to the second direction.

5. The light-emitting device of claim 1, wherein:
the light emission surface of the saddle-shaped lens contacts the semiconductor substrate or a layer thereon at a slope angle equal to or larger than forty (40) degrees.

6. The light-emitting device of claim 1, wherein a second refractive index of the second dielectric is more than 0.2 times larger than a first refractive index of the monolithic first dielectric.

7. The light-emitting device of claim 1, wherein the light source comprises at least one of a vertical-cavity surface-emitting laser (VCSEL) or a vertical external-cavity surface-emitting laser (VECSEL).

8. The light-emitting device of claim 1, wherein the light source comprises an organic light-emitting diode (OLED).

9. A light-emitting device, comprising:
a semiconductor substrate;
a surface-emitting semiconductor light source on the semiconductor substrate;
a first dielectric, transparent to light emitted by the light source, comprising a saddle-shaped lens over an aperture of the light source, the saddle-shaped lens reshaping a beam of light emitted by the light source to have a high aspect ratio; and
a second dielectric, transparent to light emitted by the light source, encapsulating a light emission surface of the saddle-shaped lens; wherein:
the second dielectric has a higher refractive index than the first dielectric.

10. The light-emitting device of claim 9, wherein:
the first dielectric further comprises:
a first dielectric feature adjacent the aperture of the light source; and
a second dielectric feature adjacent the aperture of the light source; wherein:
the first dielectric is monolithic, with the first dielectric feature connected to the second dielectric feature by the saddle-shaped lens.

11. The light-emitting device of claim 9, wherein:
the saddle-shaped lens has a height and a width at a center of a length of the saddle-shaped lens; and
the length is greater than the width.

12. The light-emitting device of claim 9, wherein the second dielectric has a light emission surface parallel to a surface of the semiconductor substrate containing the aperture.

13. The light-emitting device of claim 9, wherein the light source comprises a laser.

14. The light-emitting device of claim 9, wherein the light source comprises a light-emitting diode (LED).

15. A light-emitting device, comprising:
a set of one or more semiconductor die;
a set of surface-emitting semiconductor light sources on the set of one or more semiconductor die, the set of surface-emitting semiconductor light sources including a first light source and a second light source;
a first saddle-shaped lens connecting a first pair of micro-lenses, the first saddle-shaped lens disposed over a first aperture of the first light source; and
a second saddle-shaped lens connecting a second pair of micro-lenses, the second saddle-shaped lens disposed over a second aperture of the second light source; and
a dielectric, transparent to light emitted by the first light source and the second light source, encapsulating light emission surfaces of the first saddle-shaped lens and the second saddle-shaped lens; wherein:
each of the first saddle-shaped lens and the second saddle-shaped lens reshapes a beam of light emitted by the first light source or the second light source to have a high aspect ratio;
the first saddle-shaped lens has a different angular orientation than the second saddle-shaped lens; and
the dielectric has a higher refractive index than the first saddle-shaped lens and the second saddle-shaped lens.

16. The light-emitting device of claim 15, wherein:
the set of surface-emitting semiconductor light sources includes a third light source;
the light-emitting device further comprises a third saddle-shaped lens over a third aperture of the third light source;
the dielectric further encapsulates a light emission surface of the third saddle-shaped lens;
the third saddle-shaped lens reshapes a beam of light emitted by the third light source to have a high aspect ratio; and
the third saddle-shaped lens has a different angular orientation than the first saddle-shaped lens and the second saddle-shaped lens.

17. The light-emitting device of claim 16, wherein:
each of the first saddle-shaped lens, the second saddle-shaped lens, and the third saddle-shaped lens reshapes a beam of light to have a greatest divergence along a respective first axis, second axis, and third axis; and
each of the first axis, the second axis, and the third axis intersects each other of the first axis, the second axis, and the third axis.

18. The light-emitting device of claim 17, further comprising:
a controller operable to activate and deactivate the first light source, the second light source, and the third light source in an alternating manner, to simulate a single, rotating, high aspect ratio, beam of light at a far field.

19. The light-emitting device of claim 15, further comprising:
a controller operable to activate the first light source and the second light source at different times.

20. The light-emitting device of claim 15, further comprising:
a controller operable to activate and deactivate the first light source and the second light source simultaneously.

* * * * *